US011715059B2

(12) United States Patent
Johnson et al.

(10) Patent No.: US 11,715,059 B2
(45) Date of Patent: Aug. 1, 2023

(54) SYSTEMS AND METHODS FOR CONDITION COMPLIANCE

(71) Applicant: Walmart Apollo, LLC, Bentonville, AR (US)

(72) Inventors: Christopher M. Johnson, Bentonville, AR (US); Jeffrey D. Thiessen, Rogers, AR (US); Carla Denise Sharpe, Springdale, AR (US); Anand Banik, Secaucus, NJ (US)

(73) Assignee: Walmart Apollo, LLC, Bentonville, AR (US)

( * ) Notice: Subject to any disclaimer, the term of this patent is extended or adjusted under 35 U.S.C. 154(b) by 466 days.

(21) Appl. No.: 16/596,966

(22) Filed: Oct. 9, 2019

(65) Prior Publication Data
US 2020/0118072 A1   Apr. 16, 2020

Related U.S. Application Data

(60) Provisional application No. 62/744,766, filed on Oct. 12, 2018.

(51) Int. Cl.
*G06Q 10/0833* (2023.01)
*H04W 8/00* (2009.01)
*H04W 4/35* (2018.01)

(52) U.S. Cl.
CPC ......... *G06Q 10/0833* (2013.01); *H04W 4/35* (2018.02); *H04W 8/005* (2013.01)

(58) Field of Classification Search
CPC ..... G06Q 10/0833; H04W 4/35; H04W 8/005
(Continued)

(56) References Cited

U.S. PATENT DOCUMENTS 4,750,197 A * 6/1988 Denekamp ............. G07C 5/008
235/375
5,369,995 A   12/1994 Scheinbeim
(Continued)

FOREIGN PATENT DOCUMENTS

CA   2469699   1/2016
CN   1789992   6/2006
(Continued)

OTHER PUBLICATIONS

"On Architecture of Low Power Wireless Sensor Networks for Container Tracking and Monitoring Applications" Published by IEEE (Year: 2007).*
(Continued)

*Primary Examiner* — Zeina Elchanti
(74) *Attorney, Agent, or Firm* — Fitch, Even, Tabin & Flannery LLP

(57) ABSTRACT

In some embodiments, apparatuses and methods are provided herein useful to monitoring condition compliance. In some embodiments, a system comprises a child device comprising a child device sensor configured to capture condition data, a child device memory configured to store the condition data, a child device transmitter configured to transmit the condition data, and a control circuit configured to cause transmission of a discovery message, receive acknowledgment messages, determine if the discovery message reached a parent device, if the discovery message reached a parent device, cause transmission of the condition data to the parent device, and if the discovery message did not reach a parent device, determine, from the other devices, one of the other devices, and cause transmission of the condition data to the one of the other devices, and the parent device configured to store and transmit condition data received from a plurality of child devices.

18 Claims, 3 Drawing Sheets

(58) Field of Classification Search
USPC .......................................................... 705/333
See application file for complete search history.

(56) References Cited

U.S. PATENT DOCUMENTS

| | | | |
|---|---|---|---|
| 5,621,162 A | 4/1997 | Yun | |
| 5,671,362 A | 9/1997 | Cowe | |
| 5,774,053 A | 6/1998 | Porter | |
| 5,791,497 A | 8/1998 | Campbell | |
| 5,835,012 A | 11/1998 | Wilk | |
| 6,204,763 B1 | 3/2001 | Sone | |
| 6,285,282 B1 | 9/2001 | Dorenbosch et al. | |
| 6,294,997 B1 | 9/2001 | Paratore et al. | |
| 6,296,187 B1 | 10/2001 | Shearer | |
| 6,386,454 B2 | 5/2002 | Hecht | |
| 6,435,002 B1 | 8/2002 | Briggs | |
| 6,497,367 B2 | 12/2002 | Conzola | |
| 6,549,135 B2 | 4/2003 | Singh | |
| 6,600,418 B2 | 7/2003 | Francis | |
| 6,624,752 B2 | 9/2003 | Klitsgaard | |
| 6,779,722 B1 | 8/2004 | Mason | |
| 6,847,447 B2 | 1/2005 | Ozanich | |
| 6,865,516 B1 | 3/2005 | Richardson | |
| 6,876,990 B2 | 4/2005 | Yamanishi | |
| 6,965,871 B1 | 11/2005 | Szabo | |
| 6,970,100 B2 | 11/2005 | Lovegreen | |
| 6,982,640 B2 | 1/2006 | Lindsay | |
| 7,004,621 B2 | 2/2006 | Roberts | |
| 7,027,958 B2 | 4/2006 | Singh | |
| 7,057,495 B2 | 6/2006 | Debord | |
| 7,065,501 B1 | 6/2006 | Brown | |
| 7,148,803 B2 | 12/2006 | Bandy | |
| 7,185,810 B2 | 3/2007 | White | |
| 7,245,386 B2 | 7/2007 | Philipps | |
| 7,248,147 B2 | 7/2007 | Debord | |
| 7,271,720 B2 | 9/2007 | Tabe | |
| 7,271,724 B2 | 9/2007 | Goyal | |
| 7,287,694 B2 | 10/2007 | Banavar | |
| 7,298,257 B2 | 11/2007 | Suzuki | |
| 7,347,361 B2 | 3/2008 | Lovett | |
| 7,372,003 B2 | 5/2008 | Kates | |
| 7,434,724 B2 | 10/2008 | Lane | |
| 7,450,247 B2 | 11/2008 | Sandberg | |
| 7,455,225 B1 | 11/2008 | Hadfield | |
| 7,487,913 B2 | 2/2009 | Adema | |
| 7,495,558 B2 | 2/2009 | Pope | |
| 7,543,741 B2 | 6/2009 | Lovett | |
| 7,560,013 B2 | 7/2009 | Shekarriz | |
| 7,673,464 B2 | 3/2010 | Bodin | |
| 7,675,424 B2 | 3/2010 | Debord | |
| 7,693,739 B2 | 4/2010 | Schmidtberg | |
| 7,757,947 B2 | 7/2010 | Reznik | |
| 7,769,221 B1 | 8/2010 | Shakes | |
| 7,775,130 B2 | 8/2010 | Harish | |
| 7,792,711 B2 | 9/2010 | Swafford, Jr. | |
| 7,796,038 B2 | 9/2010 | Batra | |
| 7,810,720 B2 | 10/2010 | Lovett | |
| 7,835,885 B2 | 11/2010 | Ben-Tzur | |
| 7,937,244 B2 | 5/2011 | Kadaba | |
| 7,954,712 B2 | 6/2011 | Babcock | |
| 7,960,176 B2 | 6/2011 | Louvet | |
| 7,967,201 B2 | 6/2011 | Bowlus | |
| 7,978,060 B2 | 7/2011 | Mandava | |
| 8,072,605 B2 | 12/2011 | Costa | |
| 8,102,101 B2 | 1/2012 | Giurgiutiu | |
| 8,112,303 B2 | 2/2012 | Eglen | |
| 8,203,603 B2 | 6/2012 | Harbert | |
| 8,279,065 B2 | 10/2012 | Butler | |
| 8,306,871 B2 | 11/2012 | Farmer | |
| 8,325,036 B1 | 12/2012 | Fuhr | |
| 8,334,970 B2 | 12/2012 | Wildenbeest | |
| 8,354,927 B2 | 1/2013 | Breed | |
| 8,412,590 B2 | 4/2013 | Elliott | |
| 8,447,665 B1 | 5/2013 | Schoenharl | |
| 8,626,193 B1* | 1/2014 | Crossno | G06Q 10/0833 455/457 |
| 8,682,760 B2 | 3/2014 | Cameo | |
| 8,786,407 B2 | 7/2014 | Liu | |
| 8,803,970 B2 | 8/2014 | Weisensale | |
| 8,870,453 B2 | 10/2014 | Branch | |
| 8,947,234 B2 | 2/2015 | Doan | |
| 8,989,053 B1* | 3/2015 | Skaaksrud | H04W 4/38 370/255 |
| 8,994,508 B2 | 3/2015 | Dacus | |
| 9,024,755 B2 | 5/2015 | Fuhr | |
| 9,030,295 B2 | 5/2015 | Allen | |
| 9,031,990 B2 | 5/2015 | Scott | |
| 9,218,585 B2 | 12/2015 | Gupta | |
| 9,244,147 B1 | 1/2016 | Soundararajan | |
| 9,275,361 B2 | 3/2016 | Meyer | |
| 9,316,595 B2 | 4/2016 | Wakita | |
| 9,350,734 B1* | 5/2016 | Jamshidi | H04W 12/06 |
| 9,366,483 B2 | 6/2016 | Eckhoff | |
| 9,443,217 B2 | 9/2016 | Iyer | |
| 9,449,208 B2 | 9/2016 | Luk | |
| 9,514,323 B2 | 12/2016 | Mehring | |
| 9,524,648 B1* | 12/2016 | Gopalakrishnan | G06F 21/00 |
| 9,557,224 B2 | 1/2017 | Eisenstadt | |
| 9,569,944 B2* | 2/2017 | Barnes | G08B 13/2468 |
| 9,710,754 B2 | 7/2017 | Kaye | |
| 9,766,114 B2 | 9/2017 | Ademe | |
| 9,789,518 B2 | 10/2017 | Iino | |
| 9,794,165 B1* | 10/2017 | Wood | H04L 45/125 |
| 9,811,632 B2 | 11/2017 | Grabiner | |
| 9,824,298 B1 | 11/2017 | Krishnan Gorumkonda | |
| 9,835,498 B2 | 12/2017 | Haarer | |
| 9,888,214 B2 | 2/2018 | Bateman | |
| 9,915,638 B2 | 3/2018 | Pakstaite | |
| 10,009,667 B2 | 6/2018 | Taylor | |
| 10,060,798 B1 | 8/2018 | Riscalla | |
| 10,089,556 B1 | 10/2018 | Xu | |
| 10,176,451 B2 | 1/2019 | Nemet | |
| 10,187,593 B2 | 1/2019 | Holmes | |
| 10,223,610 B1 | 3/2019 | Akselrod-Ballin | |
| 10,281,200 B2 | 5/2019 | Johnston | |
| 10,285,433 B2 | 5/2019 | Ademe | |
| 10,324,439 B2 | 6/2019 | Lagares-Greenblatt | |
| 10,373,472 B2 | 8/2019 | Johnston | |
| 10,386,827 B2 | 8/2019 | Enver | |
| 10,423,918 B2 | 9/2019 | Mehring | |
| 10,445,684 B2 | 10/2019 | Mehring | |
| 10,452,959 B1 | 10/2019 | Gautam | |
| 10,466,111 B2 | 11/2019 | Jones | |
| 10,546,162 B1 | 1/2020 | Diorio | |
| 10,552,654 B2 | 2/2020 | Beckmann | |
| 10,572,851 B2* | 2/2020 | Skaaksrud | G06Q 10/0836 |
| 10,591,306 B2 | 3/2020 | High | |
| 10,594,956 B2 | 3/2020 | Holmes | |
| 10,676,794 B2 | 6/2020 | Amini | |
| 10,956,856 B2 | 3/2021 | Ma | |
| 11,070,895 B2 | 7/2021 | Taylor | |
| 11,138,554 B2 | 10/2021 | Johnsen | |
| 2001/0045449 A1 | 11/2001 | Shannon | |
| 2002/0119513 A1 | 8/2002 | Alocilja | |
| 2003/0088442 A1 | 5/2003 | Michael | |
| 2003/0214387 A1 | 11/2003 | Giaccherini | |
| 2004/0018641 A1 | 1/2004 | Goldsmith | |
| 2004/0069046 A1 | 4/2004 | Sunshine | |
| 2004/0074957 A1 | 4/2004 | Devar | |
| 2004/0148117 A1 | 7/2004 | Kirshenbaum | |
| 2004/0154739 A1 | 8/2004 | Shanahan | |
| 2004/0204881 A1 | 10/2004 | Mayer | |
| 2004/0226392 A1 | 11/2004 | McNally | |
| 2004/0233055 A1* | 11/2004 | Canich | G08B 25/004 340/539.26 |
| 2005/0060246 A1 | 3/2005 | Lastinger | |
| 2005/0061877 A1 | 3/2005 | Stevens | |
| 2005/0075954 A1 | 4/2005 | Matsumoto | |
| 2005/0104730 A1 | 5/2005 | Yang | |
| 2005/0149470 A1 | 7/2005 | Fujie | |
| 2005/0197912 A1 | 9/2005 | Wittmer | |
| 2005/0203790 A1 | 9/2005 | Cohen | |
| 2005/0222889 A1 | 10/2005 | Lai | |
| 2005/0228712 A1 | 10/2005 | Bornstein | |
| 2006/0006987 A1 | 1/2006 | Hashimoto | |

(56) References Cited

U.S. PATENT DOCUMENTS

| | | | |
|---|---|---|---|
| 2006/0011721 A1* | 1/2006 | Olsen | G06Q 10/087 235/385 |
| 2006/0018274 A1* | 1/2006 | Twitchell | H04L 12/189 370/328 |
| 2006/0071774 A1 | 4/2006 | Brown | |
| 2006/0080819 A1 | 4/2006 | McAllister | |
| 2006/0096303 A1 | 5/2006 | Kavounas | |
| 2006/0097875 A1 | 5/2006 | Reinhold | |
| 2006/0171332 A1* | 8/2006 | Barnum | H04W 8/005 370/254 |
| 2006/0192652 A1* | 8/2006 | Mandava | G06K 7/10069 340/572.1 |
| 2006/0238307 A1 | 10/2006 | Bauer | |
| 2006/0244718 A1 | 11/2006 | Hiddink | |
| 2007/0050070 A1 | 3/2007 | Strain | |
| 2007/0050271 A1 | 3/2007 | Ufford | |
| 2007/0064765 A1 | 3/2007 | Solie | |
| 2007/0067177 A1 | 3/2007 | Martin | |
| 2007/0067203 A1 | 3/2007 | Gil | |
| 2007/0069867 A1 | 3/2007 | Fleisch | |
| 2007/0076779 A1 | 4/2007 | Haarer | |
| 2007/0156261 A1 | 7/2007 | Caldwell | |
| 2007/0176773 A1 | 8/2007 | Smolander | |
| 2007/0221727 A1 | 9/2007 | Reznik | |
| 2008/0001752 A1 | 1/2008 | Bruns | |
| 2008/0052201 A1 | 2/2008 | Bodin | |
| 2008/0067227 A1 | 3/2008 | Poss | |
| 2008/0073431 A1 | 3/2008 | Davis | |
| 2008/0103944 A1 | 5/2008 | Hagemann | |
| 2008/0186175 A1 | 8/2008 | Stern | |
| 2008/0292759 A1 | 11/2008 | Palmer | |
| 2008/0294488 A1 | 11/2008 | Gupta | |
| 2009/0027213 A1 | 1/2009 | Debord | |
| 2009/0040063 A1 | 2/2009 | Yearsley | |
| 2009/0058644 A1 | 3/2009 | French | |
| 2009/0076645 A1 | 3/2009 | Ben-Tzur | |
| 2009/0083054 A1 | 3/2009 | Koo | |
| 2009/0119170 A1 | 5/2009 | Hammad | |
| 2009/0144122 A1 | 6/2009 | Ginsberg | |
| 2009/0261974 A1 | 10/2009 | Bailey | |
| 2009/0322481 A1 | 12/2009 | Marr, III | |
| 2010/0006646 A1 | 1/2010 | Stiller | |
| 2010/0007464 A1 | 1/2010 | McTigue | |
| 2010/0042369 A1 | 2/2010 | Mian | |
| 2010/0065632 A1 | 3/2010 | Babcock | |
| 2010/0101317 A1 | 4/2010 | Ashrafzadeh | |
| 2010/0111354 A1 | 5/2010 | Hornabrook | |
| 2010/0138281 A1 | 6/2010 | Zhang | |
| 2010/0253504 A1* | 10/2010 | Lliteras | G08B 21/22 340/539.11 |
| 2011/0029413 A1 | 2/2011 | Ben-Tzur | |
| 2011/0035326 A1 | 2/2011 | Sholl | |
| 2011/0068921 A1 | 3/2011 | Shafer | |
| 2011/0301903 A1 | 12/2011 | Humbert | |
| 2012/0101876 A1 | 4/2012 | Turvey | |
| 2012/0161967 A1 | 6/2012 | Stern | |
| 2012/0264446 A1 | 10/2012 | Xie | |
| 2012/0267541 A1 | 10/2012 | Utukuri | |
| 2012/0304014 A1 | 11/2012 | Prophete | |
| 2012/0310853 A1 | 12/2012 | Aldstadt | |
| 2013/0002443 A1* | 1/2013 | Breed | B65D 90/48 340/686.1 |
| 2013/0117053 A2 | 5/2013 | Campbell | |
| 2013/0176115 A1 | 7/2013 | Puleston | |
| 2013/0214797 A1 | 8/2013 | Gruden | |
| 2013/0218511 A1 | 8/2013 | Mager | |
| 2013/0235206 A1 | 9/2013 | Smith | |
| 2013/0282522 A1 | 10/2013 | Hassan | |
| 2014/0138440 A1 | 5/2014 | D'Ambrosio | |
| 2014/0146164 A1 | 5/2014 | Bajema | |
| 2014/0147015 A1 | 5/2014 | Bajema | |
| 2014/0180953 A1 | 6/2014 | Westcott | |
| 2014/0201041 A1 | 7/2014 | Meyer | |
| 2014/0294239 A1 | 10/2014 | Duckett | |
| 2014/0297487 A1 | 10/2014 | Bashkin | |
| 2014/0313055 A1 | 10/2014 | Warkentin | |
| 2014/0316875 A1 | 10/2014 | Tkachenko | |
| 2014/0330407 A1 | 11/2014 | Corder | |
| 2015/0015373 A1 | 1/2015 | Mongrenier | |
| 2015/0019391 A1* | 1/2015 | Kumar | G06Q 10/087 705/28 |
| 2015/0021401 A1 | 1/2015 | Rajagopal | |
| 2015/0022313 A1 | 1/2015 | Maier | |
| 2015/0041616 A1 | 2/2015 | Gentile | |
| 2015/0048938 A1 | 2/2015 | Tew | |
| 2015/0084100 A1 | 3/2015 | Sablong | |
| 2015/0095255 A1* | 4/2015 | Hall | G01S 19/16 705/333 |
| 2015/0102903 A1* | 4/2015 | Wilkinson | A47G 29/141 340/5.61 |
| 2015/0154550 A1* | 6/2015 | Skaaksrud | H04W 8/24 705/333 |
| 2015/0186840 A1 | 7/2015 | Torres | |
| 2015/0192475 A1 | 7/2015 | Eisenstadt | |
| 2015/0245179 A1* | 8/2015 | Jarvis | H04W 72/12 455/456.1 |
| 2015/0338846 A1 | 11/2015 | Boivin | |
| 2015/0347945 A1 | 12/2015 | Reese | |
| 2015/0349917 A1* | 12/2015 | Skaaksrud | G06Q 10/0833 370/328 |
| 2016/0012337 A1 | 1/2016 | Kaye | |
| 2016/0026032 A1 | 1/2016 | Moore | |
| 2016/0034907 A1 | 2/2016 | Worrall | |
| 2016/0048798 A1 | 2/2016 | Meyer | |
| 2016/0063367 A1 | 3/2016 | Cai | |
| 2016/0132821 A1 | 5/2016 | Glasgow | |
| 2016/0148440 A1* | 5/2016 | Kwak | G07C 5/085 701/31.5 |
| 2016/0171434 A1 | 6/2016 | Ladden | |
| 2016/0189087 A1 | 6/2016 | Morton | |
| 2016/0203591 A1 | 7/2016 | Justaniah | |
| 2016/0217417 A1 | 7/2016 | Ma | |
| 2016/0239794 A9 | 8/2016 | Shafer | |
| 2016/0260059 A1* | 9/2016 | Benjamin | H04W 4/027 |
| 2016/0283904 A1 | 9/2016 | Siegel | |
| 2016/0292634 A1 | 10/2016 | Mehring | |
| 2016/0307040 A1 | 10/2016 | Shulman | |
| 2016/0314514 A1 | 10/2016 | High | |
| 2016/0350715 A1 | 12/2016 | Minvielle | |
| 2016/0350756 A1 | 12/2016 | Shepard | |
| 2017/0039194 A1 | 2/2017 | Tschetter | |
| 2017/0039511 A1 | 2/2017 | Corona | |
| 2017/0059391 A1 | 3/2017 | Ademe | |
| 2017/0061171 A1* | 3/2017 | Lombardi | G06Q 10/08 |
| 2017/0061394 A1 | 3/2017 | High | |
| 2017/0074921 A1 | 3/2017 | Uota | |
| 2017/0102694 A1 | 4/2017 | Enver | |
| 2017/0116565 A1 | 4/2017 | Feiner | |
| 2017/0122771 A1 | 5/2017 | Keal | |
| 2017/0164773 A1 | 6/2017 | Wirtz | |
| 2017/0255901 A1 | 9/2017 | Bermudez Rodriguez | |
| 2017/0269601 A1 | 9/2017 | Jones | |
| 2017/0280351 A1* | 9/2017 | Skaaksrud | H04L 43/16 |
| 2017/0286905 A1 | 10/2017 | Richardson | |
| 2017/0300984 A1 | 10/2017 | Hurwich | |
| 2017/0322090 A1 | 11/2017 | Jones | |
| 2017/0344934 A1 | 11/2017 | Millhouse | |
| 2017/0344935 A1 | 11/2017 | Mattingly | |
| 2018/0007453 A1 | 1/2018 | Taylor | |
| 2018/0039853 A1 | 2/2018 | Liu | |
| 2018/0045700 A1 | 2/2018 | Biermann | |
| 2018/0078992 A1 | 3/2018 | High | |
| 2018/0096175 A1 | 4/2018 | Schmeling | |
| 2018/0137642 A1 | 5/2018 | Malisiewicz | |
| 2018/0143131 A1 | 5/2018 | Choi | |
| 2018/0144300 A1* | 5/2018 | Wiechers | G06Q 10/0836 |
| 2018/0144430 A1 | 5/2018 | Millhouse | |
| 2018/0150684 A1 | 5/2018 | Wang | |
| 2018/0168054 A1 | 6/2018 | Scarlata | |
| 2018/0180492 A1 | 6/2018 | Ribi | |
| 2018/0181838 A1 | 6/2018 | Yang | |
| 2018/0195869 A1 | 7/2018 | High | |
| 2018/0211208 A1 | 7/2018 | Winkle | |

(56) References Cited

U.S. PATENT DOCUMENTS

| | | |
|---|---|---|
| 2018/0217118 A1 | 8/2018 | Payne |
| 2018/0242768 A1 | 8/2018 | Lewis |
| 2018/0247257 A1 | 8/2018 | Lert, Jr. |
| 2018/0270631 A1 | 9/2018 | High |
| 2018/0279023 A1 | 9/2018 | Taylor |
| 2018/0290809 A1 | 10/2018 | Espinosa |
| 2018/0315011 A1 | 11/2018 | Clarke |
| 2018/0341905 A1 | 11/2018 | Johnsen |
| 2019/0073770 A1 | 3/2019 | Moradi |
| 2019/0147396 A1 | 5/2019 | Bohling |
| 2019/0223643 A1 | 7/2019 | Hara |
| 2019/0285603 A1 | 9/2019 | Ckristian |
| 2020/0034962 A1 | 1/2020 | Mathew |
| 2020/0085290 A1 | 3/2020 | Wang |
| 2020/0160497 A1 | 5/2020 | Shah |
| 2020/0242402 A1 | 7/2020 | Jung |
| 2020/0275010 A1 | 8/2020 | Bohling |
| 2021/0398065 A1 | 12/2021 | Johnsen |
| 2022/0010160 A1* | 1/2022 | Zhong .............. C09D 11/037 |
| 2022/0210314 A1 | 6/2022 | Bohling |

FOREIGN PATENT DOCUMENTS

| | | |
|---|---|---|
| CN | 201314907 | 9/2009 |
| CN | 202306566 | 7/2012 |
| CN | 102930649 | 2/2013 |
| CN | 203275285 | 11/2013 |
| CN | 203306566 | 11/2013 |
| CN | 103543703 | 1/2014 |
| CN | 103593746 | 2/2014 |
| CN | 104036354 | 9/2014 |
| CN | 204010264 | 12/2014 |
| CN | 104749329 | 7/2015 |
| CN | 204514846 | 7/2015 |
| CN | 204989059 | 1/2016 |
| CN | 105444504 | 3/2016 |
| CN | 106408173 | 2/2017 |
| CN | 106600286 | 4/2017 |
| CN | 107703269 | 2/2018 |
| EP | 1221613 | 7/2002 |
| EP | 1374688 | 1/2004 |
| EP | 2165298 | 3/2010 |
| EP | 2509412 | 10/2012 |
| EP | 2509412 A1 | 10/2012 |
| EP | 2835078 | 2/2015 |
| GB | 2256708 | 12/1992 |
| JP | 2002195971 A | 7/2002 |
| JP | 2008004133 | 1/2008 |
| JP | 2008004133 A | 1/2008 |
| JP | 2013068547 | 4/2013 |
| WO | 2000078919 A1 | 12/2000 |
| WO | 2001023256 | 4/2001 |
| WO | 2003098175 | 11/2003 |
| WO | 2007052208 A1 | 5/2007 |
| WO | 2008006152 A1 | 1/2008 |
| WO | 2008016309 | 2/2008 |
| WO | 2008147897 | 12/2008 |
| WO | 2009147821 A1 | 12/2009 |
| WO | 2012125960 | 9/2012 |
| WO | 2013174983 | 11/2013 |
| WO | 2014059048 | 4/2014 |
| WO | 2015061429 | 4/2015 |
| WO | 2015066594 | 5/2015 |
| WO | 2020023762 | 1/2020 |

OTHER PUBLICATIONS

U.S. Appl. No. 16/526,677, filed Jul. 30, 2019, Bohling Joshua.

Arah, Isaac Kojo et al.; "Preharvest and Postharvest Factors Affecting the Quality and Shelf Life of Harvested Tomatoes: A Mini Review"; http://downloads.hindawi.com/journals/ija/2015/478041.pdf; Available as early as Oct. 14, 2015; pp. 1-7.

Badia, Ricardo; "Cold Chain Logistics: Assessing the Challenge"; https://www.zestlabs.com/assessing-cold-chain-logistics/; Mar. 19, 2019; pp. 1-4.

Barthe, J.F.; "D.2.3.2. Database of consumer awareness, expectations and concerns on cold chain"; http://www.frisbee-project.eu/images/result/FRISBEE_DEL_2-3-2.pdf; Dec. 2, 2011; pp. 1-26.

Barthe, J.F.; "D.2.3.2.1 Survey questionnaires and materials for studies of consumer perspectives and attitudes towards refrigerated foods, the cold chain and relevant refrigeration technologies (Informed consent forms, privacy, personal data handling)"; http://www.frisbee-project.eu/images/result/FRISBEE_DEL_2-3-2-1.pdf Feb. 8, 2012; pp. 1-21.

Bogataj, M., et al.; "Stability of perishable goods in cold logistic chains"; International Journal of Production Economics, vol. 93-94; 2005; pp. 345-356.

Capgemini; "Schuitema Revolutionizes Food Quality Control Through RFID"; https://www.capgemini.com/se-en/wp-content/uploads/sites/29/2017/07/Schuitema_Revolutionizes_Food_Quality_Control_Through_RFID.pdf; Jul. 29, 2017; pp. 1-2.

Chainlink Research; "Achieving Consistent Product Quality"; https://www.zestlabs.com/wp-content/uploads/2016/12/Quality-Management-For-Produ ce.pdf; Available as early as Dec. 2016; pp. 1-8.

Chainlink Research; "Measuring Produce Freshness: The Key to Preventing Waste"; https://www.zestlabs.com/wp-content/uploads/2016/03/Measuring-Produce-Freshness. pdf; Available as early as Mar. 2016; pp. 1-12.

Chainlink Research; "Preemptive Freshness Management"; https://www.zestlabs.com/wp-content/uploads/2017/03/Preemptive-Freshness-Managem ent.pdf; Available as early as Mar. 2017; pp. 1-8.

Chainlink Research; "Blockchain's Role in the Produce Supply Chain"; https://www.zestlabs.com/wp-content/uploads/2018/01/Blockchains-Role-in-the-Prod uce-Supply-Chain.pdf; Available as early as Jan. 2018; pp. 1-20.

Chainlink Research; "Pallet-level Monitoring"; https://www.zestlabs.com/wp-content/uploads/2016/03/Pallet-Monitoring-for-the-Fr esh-Food-Supply-Chain.pdf; Available as early as Mar. 2016; pp. 1-9.

Chainlink Research; "Why Quality Consistency Matters"; https://www.zestlabs.com/wp-content/uploads/2016/03/Why-Food-Supply-Chain-Qualit y-Matters-1.pdf; Available as early as Mar. 2016; pp. 1-10.

Claussen, Ingrid C.; "Deliverable D.3.2.4.3 Literature review and experimental data of chilled, superchilled/supercooled fish quality and safety models"; http://www.frisbee-project.eu/images/result/FRISBEE_DEL_3-2-4-3.pdf; May 6, 2011; pp. 1-29.

Colmer, Christian; "Chill—ON! Transparent food quality all the way"; https://www.innovations-report.com/html/reports/medicine-health/chill-transparen t-food-quality-168201.html; Oct. 1, 2011; pp. 1-5.

Cotillon, C.; "Deliverable 8.2.1.1 Publication in Scientific Journals"; http://www.frisbee-project.eu/images/result/FRISBEE_DEL_8.2.1.1.pdf; Oct. 27, 2011; pp. 1-5.

Cotillon, C.; "Deliverable 8.3.3.1 Mini conferences"; http://www.frisbee-project.eu/images/result/FRISBEE_DEL_8.3.3.1.pdf; Dec. 7, 2011; pp. 1-8.

Cotillon, C.; "Deliverable 8.6.1 Report on collaboration with other EU projects"; http://www.frisbee-project.eu/images/result/FRISBEE_DEL_8.6.1.pdf; Dec. 5, 2011; pp. 1-12.

Dada, Ali, et al.; "Sensor Applications in the Supply Chain: The Example of Quality-Based Issuing of Perishables"; The Internet of Things. Lecture Notes in Computer Science, edited by Christian Floerkemeier, et al.; vol. 4952; 2008; pp. 140-154.

Desmedt, Frederique; "Deliverable 8.1.1 Project logo, Leaflet and PowerPoint presentation"; http://www.frisbee-project.eu/images/result/FRISBEE_DEL_8.1.1.pdf; Nov. 19, 2010; pp. 1-30.

Desmedt, Frederique; "Deliverable 8.1.2 Project internet and intranet website"; http://www.frisbee-project.eu/images/result/FRISBEE_DEL_8.1.2.pdf; Mar. 3, 2011; pp. 1-9.

Do Nascimento Nunes, M. C., et al.; "Improvement in fresh fruit and vegetable logistics quality: berry logistics field studies"; Philosophical Transactions of the Royal Society; http://dx.doi.org/10.1098/rsta.2013.0307; 2014; pp. 1-19.

Doyle, John P.; "Seafood Shelf Life as a Function of Temperature"; Alaska Sea Grant Marine Advisory Program; No. 30; 1989; pp. 1-6.

(56) References Cited

OTHER PUBLICATIONS

Evans, J.; "Deliverable D2.2.2 : Assessment of current refrigeration technologies of selected food industries and their potential improvement in current refrigeration"; http://www.frisbee-project.eu/images/result/FRISBEE_DEL_2-2-2.pdf; Jan. 30, 2012; pp. 1-181.

Evans, Judith et al.; "Deliverable D.2.2.3 : Analysis of potential of novel refrigeration technologies suitable for selected industries for application and improvement of food quality, energy consumption and environmental impact"; http://www.frisbee-project.eu/images/result/FRISBEE_DEL_2-2-3.pdf; Dec. 2, 2011; pp. 1-54.

Friedlos, Dave; "New Zealand Kiwifruit Processor Finds ROI"; https://www.rfidjournal.com/articles/view?4090; May 20, 2008; pp. 1-4.

Frisbee; "Frisbee european project—Archive"; https://web.archive.org/web/20180815100417/http://www.frisbee-project.eu/archive-results.html; Available as early as Aug. 15, 2018; pp. 1-5.

Frisbee; "Frisbee european project—Developing novel breakthrough technologies"; https://web.archive.org/web/20180316101206/http://www.frisbee-project.eu/researc h/92-developing-novel-breakthrough-technologies.html; Available as early Mar. 16, 2018; pp. 1-3.

Frisbee; "Frisbee european project—Frisbee at the Sixteenth Conference on Food Microbiology, Belgium"; http://www.frisbee-project.eu/news/40-frisbee-at-the-sixteenth-conference-on-foo d-microbiology.html; Nov. 15, 2011; pp. 1-1.

Frisbee; "Frisbee european project—Frisbee develops a Virtual Platform application"; http://www.frisbee-project.eu/news/90-frisbee-develops-a-virtual-platform-applic ation.html; Mar. 18, 2013; pp. 1-1.

Frisbee; "Frisbee european project—Frisbee dissemination activities"; http://www.frisbee-project.eu/news/91-frisbee-dissemination-activities.html; Mar. 18, 2013; pp. 1-1.

Frisbee; "Frisbee european project—Frisbee on the starting-blocks"; http://www.frisbee-project.eu/news/49-frisbee-on-the-starting-blocks.html; Mar. 9, 2012; pp. 1-2.

Frisbee; "Frisbee european project—Frisbee welcomes New Members Advisory Board"; http://www.frisbee-project.eu/news/48-new-members-advisory-board.html; Mar. 9, 2012; pp. 1-1.

Frisbee; "Frisbee european project—Frisbee: Latest Developments"; http://www.frisbee-project.eu/news/42-frisbee-project-latest-developments.html; Dec. 21, 2011; pp. 1-2.

Frisbee; "Frisbee european project—Join the first European Food Cold Chain Database!!!";http://www.frisbee-project.eu/news/55-database2.html; Jul. 9, 2012; pp. 1-2.

Frisbee; "Frisbee european project—Magnetic refrigeration technology. Frisbee's experts team work on this disruptive technology"; https://web.archive.org/web/20180316101206/http://www.frisbee-project.eu/researc h/51-magnetic-refrigeration-technology.html; Available as early as Mar. 16, 2018; pp. 1-3.

Frisbee; "Frisbee european project—MEP-scientist pairing scheme"; http://www.frisbee-project.eu/news/41-mep-scientist-pairing-scheme.html; Dec. 20, 2011; pp. 1-2.

Frisbee; "Frisbee european project—Nanoparticles, a concentrate of energy: PCM nanoparticles where low temperatures are needed"; https://web.archive.org/web/20180316101206/http://www.frisbee-project.eu/researc h/27-nanoparticles-a-concentrate-of-energy.html; Available as early as Mar. 16, 2018; pp. 1-2.

Frisbee; "Frisbee european project—Project Overview"; https://web.archive.org/web/20120211082956/http://www.frisbee-project.eu/project -overview.html; Available as early as Feb. 11, 2012; pp. 1-1.

Frisbee; "Frisbee european project—Saving energy by refrigeration predictive control"; https://web.archive.org/web/20180316101206/http://www.frisbee-project.eu/researc h/52-saving-energy-by-refrigeration-predictive-control.html; Available as early as Mar. 16, 2018; pp. 1-3.

Frisbee; "Frisbee european project—Superchilling! A new technology to have your food products fresher than fresh"; https://web.archive.org/web/20180316101206/http://www.frisbee-project.eu/researc h/50-superchilling.html; Available as early as Mar. 16, 2018; pp. 1-3.

Frisbee; "Frisbee european project—Taking Europe's temperature: Cold chain database"; http://www.frisbee-project.eu/news/89-taking-europe%E2%80%99s-temperature-cold-c hain-database.html; Mar. 18, 2013; pp. 1-2.

Frisbee; "Frisbee european project—Workpackages"; https://web.archive.org/web/20120210124516/http://www.frisbee-project.eu/workpac kages.html; Available as early as Feb. 10, 2012; pp. 1-2.

Frisbee; "Simulate a cold chain"; https://frisbee-etool.irstea.fr; Available as early as 2020; pp. 1-3.

Gapud, Veny; "Food Safety Trends Exploring Implications of Mandatory Safety Standards in Retail and Foodservice"; https://www.foodsafetymagazine.com/magazine-archive1/december-2009january-2010/f ood-safety-trends-exploring-implications-of-mandatory-safety-standards-in-retail -and-foodservice/; Dec. 12, 2019; pp. 1-20.

Gaukler, Gary et al.; "Establishing Dynamic Expiration Dates for Perishables: An Application of RFID and Sensor Technology"; International Journal of Production Economics; vol. 193; Jul. 25, 2017; pp. 617-632.

GEIE/CEMA/ITP; "Deliverable D 8.3.1.3 Newsletter edited by GEIE for industrial use N°3"; http://www.frisbee-project.eu/images/result/FRISBEE_DEL_8.3.1.3.pdf; Mar. 13, 2012; pp. 1-10.

GEIE/CEMA/ITP; "Deliverable D8.3.1.2 Newsletter edited by GEIE for industrial use N°2"; http://www.frisbee-project.eu/images/result/FRISBEE_DEL_8.3.1.2.pdf; Oct. 27, 2011; pp. 1-10.

Giannakourou, M. C., et al.; "Application of a TTI-Based Distribution Management System for Quality Optimization of Frozen Vegetables at the Consumer End"; Journal of Food Science, vol. 68, Issue 1; Jan. 2003; pp. 201-209.

Hertog, M. L. A. T. M., et al.; "Shelf-life modelling for first-expired-first-out warehouse management"; Philosophical Transactions of the Royal Society; http://dx.doi.org/10.1098/rsta.2013.0306; 2014; pp. 1-15.

IBM; "DHL Breaks New Ground with RFID-Based Real-Time Tracking of Sensitive Shipments"; ftp://ftp.software.ibm.com/software/solutions/pdfs/ODC00298-USEN-00.pdf; Available as early as Mar. 2007; pp. 1-4.

Infratab; "Infratab Freshtime RF Sensor Blockchain Solutions forthe Fresh Seafood Cold Chain"; https://web.aimglobal.org/external/wcpages/wcecommerce/eComItemDetailsPage.aspx? ItemID=656; 2019; pp. 1-5.

Jedermann, Reiner, et al.; "Communication techniques and challenges for wireless food quality monitoring"; Philosophical Transactions of the Royal Society; http://dx.doi.org/10.1098/rsta.2013.0304; 2014; pp. 1-18.

Jedermann, Reiner, et al.; "Reducing food losses by intelligent food logistics"; Philosophical Transactions of the Royal Society; http://dx.doi.org/10.1098/rsta.2013.0302; 2014; pp. 1-20.

Kader, A. A.; "Pre- and Postharvest Factors Affecting Fresh Produce Quality, Nutritional Value, and Implications for Human Health"; Proceedings of the International Congress of Food Production and the Quality of Life, Sassari (Italy) Sep. 4-8, 2000, vol. 1, pp. 109-119.

Ketzenberg, M., et al.; "Expiration Dates and Order Quantities for Perishables"; European Journal of Operational Research; vol. 266, Issue 2; Apr. 2018; pp. 569-584.

Ketzenberg, M., et al.; "Managing Perishables with Time and Temperature History"; Production and Operations Management; vol. 24, Issue 1; Jan. 2015; pp. 54-70.

Ketzenberg, M., et al.; "The Value of RFID Technology Enabled Information to Manage Perishables"; https://pdfs.semanticscholar.org/bded/16af2e689b4fdcea7f8421f6e012a6041324.pdf; Apr. 2009; pp. 1-37.

Koutsoumanis, K., et al.; "Development of a safety monitoring and assurance system for chilled food product"; International Journal of Food Microbiology, vol. 100; 2005; pp. 253-260.

Leake, Linda L.; "The Search for Shelf Life Solutions"; https://www.ift.org/news-and-publications/food-technology-magazine/issues/2007/n ovember/columns/laboratory?page=viewall; Nov. 1, 2007; pp. 1-8.

McBeath, Bill; "Winning the Freshness Wars: Creating Shopper Loyalty and Improving Profitability in Retail Grocery"; https://

(56) References Cited

OTHER PUBLICATIONS www.zestlabs.com/wp-content/uploads/2016/11/ZL_WP_FreshnessWars_060415.pdf; Available as early as Feb. 2013; pp. 1-16.
Mehring, Peter; "Blockchain for Food Safety—Addressing the Challenges"; https://www.zestlabs.com/will-blockchain-solve-food-safety-challenges/; Sep. 26, 2018; pp. 1-4.
Mehring, Peter; "Zest Labs CEO Peter Mehring on the Walmart Lawsuit"; https://www.zestlabs.com/zest-labs-ceo-peter-mehring-walmart-lawsuit/; Aug. 1, 2018; pp. 1-4.
NBC Bay Area; "Tech Company Helps Inspect Food During Shutdown"; https://www.nbcbayarea.com/news/tech/tech-company-helps-inspect-food-during-shutdown_bay-area/4851; Jan. 11, 2019; pp. 1-6.
NRDC; "Wasted: How America is Losing up to 40 Percent of Its Food From Farm to Fork Landfill"; https://www.nrdc.org/sites/default/files/wasted-2017-report.pdf; Available as early as Aug. 2017; pp. 1-58.
Opatova, H.; "Deliverable 8.2.2.1 Organisation of a Workshop in Prague 2011 at International Congress of Refrigeration"; http://www.frisbee-project.eu/images/result/FRISBEE_DEL_8.2.2.1.pdf; Oct. 27, 2011; pp. 1-8.
Payne, Kevin;" New Verizon Ad Sheds Light on Important Food Safety Issues"; https://www.zestlabs.com/new-verizon-ad-sheds-light-on-important-food-safety-iss ues/; Dec. 15, 2017; pp. 1-4.
Payne, Kevin; "Agriculture Technology and "The Messy Middle""; https://www.zestlabs.com/agriculture-technology-messy-middle/; Jun. 25, 2019; pp. 1-4.
Payne, Kevin; "Are You Ready to Make 2018 Your Best Year Ever?" https://www.zestlabs.com/are-you-ready-to-make-2018-your-best-year-ever/; Feb. 13, 2018; pp. 1-4.
Payne, Kevin; "Blockchain for Fresh Food Supply Chains—Reality Sets In?"; https://www.zestlabs.com/blockchain-fresh-supply-chains-reality/; May 7, 2019; pp. 1-4.
Payne, Kevin; "Cold Chain Visibility: Who's Winning the Freshness Wars?"; https://www.zestlabs.com/cold-chain-visibility-freshness-wars/; Apr. 9, 2019; pp. 1-4.
Payne, Kevin; "Cold Supply Chain Variability—The Impact of Delays"; https://www.zestlabs.com/cold-supply-chain-variability/; Apr. 23, 2019; pp. 1-4.
Payne, Kevin; "Earth Day 2019 and Looking Ahead to 2020"; https://www.zestlabs.com/earth-day-2019/; Apr. 30, 2019; pp. 1-4.
Payne, Kevin; "Finding the Right Tools: Can Blockchain and IOT Fix the Fresh Food Supply Chain?—Register for the Webinar"; https://www.zestlabs.com/finding-the-right-tools-can-blockchain-and-iot-fix-the- fresh-food-supply-chain-register-for-the-webinar/; Feb. 27, 2018; pp. 1-4.
Payne, Kevin; "Food Grower And Supplier Challenges: The Top 10"; https://www.zestlabs.com/food-growers-suppliers-challenges/; Feb. 19, 2019; pp. 1-4.
Payne, Kevin; "Food Labelsand Food Waste—A Solution"; https://www.zestlabs.com/food-labels-food-waste/; Mar. 12, 2019; pp. 1-4.
Payne, Kevin; "Food Safety Tips: Three Things to Consider"; https://www.zestlabs.com/food-safety-tips-three-things-to-consider/; Jul. 2, 2019; pp. 1-4.
Payne, Kevin; "Fresh Produce and Health: What's the Connection?"; https://www.zestlabs.com/fresh-produce-health-interrelationship/; Apr. 2, 2019; pp. 1-4.
Payne, Kevin; "Grocery Shopper Trends 2019: Key Insights"; https://www.zestlabs.com/grocery-shopper-trends-2019-key-insights/; Jul. 23, 2019; pp. 1-4.
Payne, Kevin; "How to Feed a Hungry Planet: Food for Thought"; https://www.zestlabs.com/feed-a-hungry-planet/; Aug. 6, 2019; pp. 1-4.
Payne, Kevin; "Hyped Up? Blockchain and Why a Hybrid Model is Best"; https://www.zestlabs.com/hyped-up-blockchain-the-fresh-food-supply-chain-and-why -a-hybrid-model-is-best/; Jan. 30, 2018; pp. 1-4.
Payne, Kevin; "I'll Never Look at Strawberries the Same Way"; https://www.zestlabs.com/ill-never-look-at-strawberries-the-same-way/; Dec. 15, 2017; pp. 1-4.
Payne, Kevin; "Improving Operational Efficiency: TQM forthe Fresh Food Supply Chain"; https://www.zestlabs.com/improving-operational-efficiency-deming-drucker/; Aug. 27, 2019; pp. 1-4.
Payne, Kevin; "Increasing Trucking Costs Further Squeezes Grocery Margins—Don't Waste Your Money!" https://www.zestlabs.com/increasing-trucking-costs-further-squeezes-grocery-marg ins-dont-waste-your-money/; Feb. 6, 2018; pp. 1-4.
Payne, Kevin; "IoT Sensors and Reducing Food Waste"; https://www.zestlabs.com/iot-sensors-reduce-food-waste/; Feb. 12, 2019; pp. 1-4.
Payne, Kevin; "Millennials Want True Transperency"; https://www.zestlabs.com/millennials-want-true-transparency/; Jan. 9, 2018; pp. 1-4.
Payne, Kevin; "Myth Busting: Produce Shrink is Caused at the Store"; https://www.zestlabs.com/myth-busting-produce-shrink-occurs-at-the-store/; Feb. 20, 2018; pp. 1-4.
Payne, Kevin; "New Zest Fresh for Produce Modules: Rapid Implementations and Faster ROI"; https://www.zestlabs.com/zest-fresh-produce-modules/; Jul. 10, 2019; pp. 1-4.
Payne, Kevin; "Online Grocery Shopping Options Abound But . . . "; https://www.zestlabs.com/online-grocery-shopping/; Feb. 5, 2019; pp. 1-4.
Payne, Kevin; "Preventing Food Waste: Multiple Approaches"; https://www.zestlabs.com/preventing-food-waste-multiple-approaches/; Jul. 16, 2019; pp. 1-4.
Payne, Kevin; "Proactive Food Safety: Moving the Industry Forward"; https://www.zestlabs.com/proactive-food-safety/; Aug. 13, 2019; pp. 1-4.
Payne, Kevin; "Produce Marketing: Brandstorm Offers A Wealth Of Insights"; https://www.zestlabs.com/produce-marketing-ideas; Feb. 26, 2019; pp. 1-4.
Payne, Kevin; "Reducing Fresh Food Waste: Addressing the Problem"; https://www.zestlabs.com/reducing-fresh-food-waste-problem/; Mar. 5, 2019; pp. 1-4.
Payne, Kevin; "Rethinking Food Safety and the Supply Chain"; https://www.zestlabs.com/rethinking-food-safety-supply-chain/; May 14, 2019; pp. 1-5.
Payne, Kevin; "Salad Kits: How to Ensure Freshness"; https://www.zestlabs.com/salad-kits-fresh/; Apr. 16, 2019; pp. 1-4.
Payne, Kevin; "Shelf-life Variability at Grocery Stores: Half-bad is Not Good"; https://www.zestlabs.com/shelf-life-variability-among-leading-grocery-stores/; Jun. 10, 2019; pp. 1-4.
Payne, Kevin; "Start the Year Fresh!" https://www.zestlabs.com/start-the-year-fresh/; Jan. 16, 2018; pp. 1-4.
Payne, Kevin; "Supply Chain Waste: Can We Fix the Problem? (Yes)"; https://www.zestlabs.com/supply-chain-waste/; Jul. 30, 2019; pp. 1-5.
Payne, Kevin; "Sustainability and the Supply Chain"; https://www.zestlabs.com/sustainability-supply-chain/; Jun. 18, 2019; pp. 1-4.
Payne, Kevin; "Sustainability or Greenwashing" https://www.zestlabs.com/sustainability-or-greenwashing/; Jan. 23, 2018; pp. 1-4.
Payne, Kevin; "The "Best If Used By" Date Label: Will It Reduce Food Waste?"; https://www.zestlabs.com/best-if-used-by-date-label/; Jun. 4, 2019; pp. 1-4.
Payne, Kevin; "The Emergence of Brand Marketing in Produce"; https://www.zestlabs.com/brand-marketing-produce/; Aug. 20, 2019; pp. 1-4.
Payne, Kevin; "The Grocery Shopping Experience: Fresh Foods, Fresh Ideas"; https://www.zestlabs.com/grocery-shopping-experience-fresh-foods/; May 21, 2019; pp. 1-4.
Payne, Kevin; "To Use or Not to Use—What's Up With Date Labels" https://www.zestlabs.com/date-label/; Jan. 2, 2018; pp. 1-4.
Payne, Kevin; "Want to Improve Your Grocery Margins? Take a Look at Your Supply Chain"; https://www.zestlabs.com/want-to-improve-your-grocery-margins-take-a-look-at-you r-supply-chain/; Dec. 19, 2017; pp. 1-4.
Payne, Kevin; "World Hunger Day 2019: Sustainability"; https://www.zestlabs.com/world-hunger-day-2019-sustainability/; May 28, 2019; pp. 1-4.

(56) References Cited

OTHER PUBLICATIONS

Payne, Kevin; "Your Technology Roadmap for Digital Transformation"; https://www.zestlabs.com/technology-roadmap/; Mar. 26, 2019; pp. 1-4.

Payne, Kevin; "A Picture Is Worth . . . "; https://www.zestlabs.com/a-picture-is-worth/; Apr. 3, 2018; pp. 1-4.

Payne, Kevin; "Before and After—The Benefits of Digital Transformation"; https://www.zestlabs.com/benefits-digital-transformation/; Jan. 29, 2019; pp. 1-5.

Payne, Kevin; "Being Proactive: What We Can Learn from Football"; https://www.zestlabs.com/being-proactive-learn-from-football/; Jul. 17, 2018; pp. 1-4.

Payne, Kevin; "Digital Transformation Technology: Is It Finally Time?"; https://www.zestlabs.com/digital-transformation-technology/; Aug. 7, 2018; pp. 1-4.

Payne, Kevin; "Experience the Many Benefits of Family Meals"; https://www.zestlabs.com/benefits-family-meals/; Sep. 3, 2019; pp. 1-4.

Payne, Kevin; "First Principles Thinking and the Fresh Food Supply Chain"; https://www.zestlabs.com/first-principles-thinking/; Oct. 2, 2018; pp. 1-4.

Payne, Kevin; "Five Days? The Causes of Shelf-life Variability"; https://www.zestlabs.com/five-days-shelf-life-variability/; Nov. 20, 2018; pp. 1-4.

Payne, Kevin; "Food Service Delivery: This Isn't What I Ordered!"; https://www.zestlabs.com/isnt-what-ordered/; Aug. 28, 2018; pp. 1-4.

Payne, Kevin; "Food Spoilage: The Impact On Your Business"; https://www.zestlabs.com/food-spoilage-impact-business/; Jan. 15, 2019; pp. 1-4.

Payne, Kevin; "Food Sustainability Goals: Noble But Are They Viable?"; https://www.zestlabs.com/food-sustainability-goals/; Aug. 14, 2018; pp. 1-4.

Payne, Kevin; "Fresh Food Industry Trends 2019—Our Predictions"; https://www.zestlabs.com/fresh-food-industry-trends-2019/; Jan. 2, 2019; pp. 1-4.

Payne, Kevin; "Fresh Food Industry Trends from 2018"; https://www.zestlabs.com/fresh-food-industry-trends-2018/; Dec. 11, 2018; pp. 1-4.

Payne, Kevin; "Fresh Food Sustainability—It's More Than Field to Fork"; https://www.zestlabs.com/fresh-food-sustainability/; Jan. 22, 2019; pp. 1-4.

Payne, Kevin; "Freshness Capacity: Strawberries Are Like Your Cell Phone . . . "; https://www.zestlabs.com/your-fresh-strawberries-are-like-your-cellphone/; Jul. 10, 2018; pp. 1-4.

Payne, Kevin; "Grocers Are Applying Artificial Intelligence"; https://www.zestlabs.com/grocers-turning-artificial-intelligence/; Oct. 9, 2018; pp. 1-4.

Payne, Kevin; "Growers and Suppliers—What Really Happens In The Food Supply Chain"; https://www.zestlabs.com/what-happens-fresh-food-supply-chain/; Apr. 24, 2018; pp. 1-5.

Payne, Kevin; "Improving Post-Harvest Operational Efficiency"; https://www.zestlabs.com/improving-operational-efficiency/; Sep. 18, 2018; pp. 1-4.

Payne, Kevin; "Is Your Fresh Food Supply Chain Stuck In The '60s?"; https://www.zestlabs.com/is-your-fresh-food-supply-chain-stuck-in-the-60s/; Mar. 13, 2018; pp. 1-4.

Payne, Kevin; "It's (Past) Time for Freshness Management"; https://www.zestlabs.com/managing-fresh-food-shelf-life/; Nov. 27, 2018; pp. 1-4.

Payne, Kevin; "It's Like Waze For The Fresh Food Supply Chain"; https://www.zestlabs.com/waze-fresh-food-supply-chain/; Apr. 10, 2018; pp. 1-5.

Payne, Kevin; "Let's Celebrate National Salad Month!"; https://www.zestlabs.com/lets-celebrate-national-salad-month/; May 1, 2018; pp. 1-4.

Payne, Kevin; "Let's Start At The Beginning"; https://www.zestlabs.com/lets-start-at-the-beginning/; May 15, 2018; pp. 1-4.

Payne, Kevin; "Margins Matter—Don't Get Squeezed"; https://www.zestlabs.com/6931-2/; Apr. 17, 2018; pp. 1-4.

Payne, Kevin; "Perishable Food Waste Cuts Profits & Raises Greenhouse Gases"; https://www.zestlabs.com/food-waste-profits-greenhouse-gases/; Sep. 11, 2018; pp. 1-4.

Payne, Kevin; "Pma Fresh Summit 2018-Wow!"; https://www.zestlabs.com/pma-fresh-summit/; Oct. 23, 2018; pp. 1-4.

Payne, Kevin; "PMA's Fresh Summit: Eat Up!"; https://www.zestlabs.com/pma-fresh-summit-2018/; Oct. 16, 2018; pp. 1-4.

Payne, Kevin; "Poor Quality Produce: Never Going Back Again"; https://www.zestlabs.com/never-going-back-again/; Jul. 3, 2018; pp. 1-4.

Payne, Kevin; "Premature Food Spoilage: Uh Oh, It's the Fuzz!"; https://www.zestlabs.com/uh-oh-its-the-fuzz/; Jun. 19, 2018; pp. 1-4.

Payne, Kevin; "Produce Shelf Life Extenders and Fresh Food Waste"; https://www.zestlabs.com/shelf-life-extenders-food-waste/; Nov. 13, 2018; pp. 1-4.

Payne, Kevin; "Refed: Committed to Reducing U.S. Food Waste"; https://www.zestlabs.com/refed-committed-reducing-waste/; Oct. 30, 2018; pp. 1-4.

Payne, Kevin; "Romaine Lettuce Labeling—Zest Fresh Can Help"; https://www.zestlabs.com/romaine-lettuce-labeling/; Dec. 4, 2018; pp. 1-4.

Payne, Kevin; "Saving Money Day 1—Invest $1, Get $9 Back" ;https://www.zestlabs.com/saving-money-day-1/; Nov. 6, 2018; pp. 1-4.

Payne, Kevin; "September Is National Family Meals Month"; https://www.zestlabs.com/september-family-meals-month/; Sep. 4, 2018; pp. 1-4.

Payne, Kevin; "Shelf-life Variability in Produce: The Five Causes"; https://www.zestlabs.com/shelf-life-variability-produce-five-causes/; Jan. 8, 2019; pp. 1-4.

Payne, Kevin; "Solving the Problem of Fresh Produce Waste"; https://www.zestlabs.com/solving-problem-fresh-food-waste/; Dec. 18, 2018; pp. 1-4.

Payne, Kevin; "Stay Cool! (And Visit US at United Fresh!)"; https://www.zestlabs.com/stay-cool-and-visit-us-at-united-fresh/; Jun. 5, 2018; pp. 1-4.

Payne, Kevin; "Stop Doing That!"; https://www.zestlabs.com/stop-doing-that/; May 29, 2018; pp. 1-4.

Payne, Kevin; "Supply Chain Performance: The Fox and the Henhouse"; https://www.zestlabs.com/fox-hen-house/; Jun. 26, 2018; pp. 1-4.

Payne, Kevin; "The Fresh Food Industry and Charles Darwin"; https://www.zestlabs.com/charles-darwin-fresh-food-industry/; Aug. 21, 2018; pp. 1-4.

Payne, Kevin; "The Game of (Shelf) Life"; https://www.zestlabs.com/game-shelf-life/; Sep. 25, 2018; pp. 1-4.

Payne, Kevin; "Timing Is Everything—The Impact Of Cut-To-Cool Time On Freshness"; https://www.zestlabs.com/timing-is-everything-the-impact-of-cut-to-cool-time-on- freshness/; May 8, 2018; pp. 1-5.

Payne, Kevin; "What to do to Build Grocery Store Loyalty?"; https://www.zestlabs.com/grocery-store-loyalty/; Jul. 24, 2018; pp. 1-4.

Payne, Kevin; "What? No Bacon? (Cue Ominous Music)"; https://www.zestlabs.com/what-no-bacon-cue-ominous-music/; Mar. 6, 2018; pp. 1-5.

Payne, Kevin; "What's In The Bag?"; https://www.zestlabs.com/whats-in-the-bag/; May 22, 2018; pp. 1-4.

Payne, Kevin; "Where's The Beef (Been)?"; https://www.zestlabs.com/wheres-the-beef-been/; Mar. 27, 2018; pp. 1-5.

Payne, Kevin; "Zest Labs Offers Fresh Wishes for the New Year"; https://www.zestlabs.com/zest-labs-fresh-wishes-new-year/; Dec. 24, 2018; pp. 1-4.

ReFED; "A Roadmap to Reduce U.S. Food Waste by 20 Percent"; https://www.refed.com/downloads/ReFED_Report_2016.pdf; 2016; pp. 1-96.

ReFED; "Restaurant Food Waste Action Guide"; https://www.refed.com/downloads/Restaurant_Guide_Web.pdf; 2018; pp. 1-44.

Ruiz-Garcia, Luis et al.; "Monitoring Cold Chain Logistics by Means of RFID"; http://cdn.intechweb.org/pdfs/8493.pdf; Feb. 1, 2010; pp. 1-16.

(56) References Cited

OTHER PUBLICATIONS

Ryan, John; "Why Blockchain Will Be Used to Improve Distribution Food Safety, Quality, and Traceability"; https://www.foodsafetymagazine.com/enewsletter/why-blockchain-will-be-used-to-improve-distribution-food-safety-quality-and-traceability/; Feb. 5, 2019; pp. 1-3.
Scalco, Dan; "5 Ways to Ensure Meals Stay Fresh and Safe in Transit"; https://www.zestlabs.com/meals-stay-fresh-safe-transit/; Jun. 12, 2018; pp. 1-4.
Scotto Di Tella, F.; "Deliverable D8.3.1.1 Newsletter edited by GEIE for industrial use N° 1"; http://www.frisbee-project.eu/images/result/FRISBEE_DEL_8.3.1.1.pdf; May 6, 2011; pp. 1-9.
Shacklett, Mary; "Customer Retention and Growth in Today's Competitive Retail Grocery Environment"; https://www.zestlabs.com/downloads/Food-Freshness-and-Customer-Satisfaction-Transworld-Research-April-2019.pdf; Apr. 2019; pp. 1-7.
Shacklett, Mary; "Improving Profits and Operational Efficiency on the Farm"; https://www.zestlabs.com/downloads/Improving-Operational-Efficiency-on-the-Farm- Transworld-Research-2018.pdf; Available as early as 2018; pp. 1-6.
Shacklett, Mary; "Optimizing Profit Margins in a Changing Retail Grocery Industry"; https://www.zestlabs.com/downloads/Optimizing-Profit-Margins-Transworld.pdf; 2018; pp. 1-10.
Siawsolit, Chokdee et al.; "The Value of Demand Information in Omni-Channel Grocery Retailing"; https://www.researchgate.net/publication/331048136_The_Value_of_Demand_Information_in_Omni-Channel_Grocery_Retailing; Available as early as Jan. 2019; pp. 1-11.
Stahl, Valerie et al.; "Deliverable D.3.2.4.2 Literature review and experimental data of chilled and frozen meat quality and safety models"; http://www.frisbee-project.eu/images/result/FRISBEE_DEL_3.2.4.2.pdf; Jun. 6, 2011; pp. 1-28.
Sunny George, Gwanpua; "Deliverable D3.2.4.1 Literature review and experimental data of chilled apple quality models"; http://www.frisbee-project.eu/images/result/FRISBEE_DEL_3.2.4.1.pdf; Mar. 1, 2011; pp. 1-24.
Swedberg, Claire; "DOD Considers RFID-based Solutions for Tracking Food's Shelf Life"; https://www.rfidjournal.com/articles/pdf?11423; Feb. 11, 2014; pp. 1-3.
Swedberg, Claire; "Researchers Seek to Reduce Wastage for First-Strike Rations"; https://www.rfidjournal.com/articles/pdf?9162; Jan. 26, 2012; pp. 1-4.
Swedberg, Claire; "Schuitema Ponders Future of Fresh-Chain Pilot"; https://www.rfidjournal.com/articles/pdf?3793; Dec. 10, 2007; pp. 1-4.
Swedberg, Claire; "Starbucks Keeps Fresh with RFID"; https://www.rfidjournal.com/articles/view?2890; Dec. 13, 2006; pp. 1-1.
Taoukis, P. S., et al.; "Applicability of Time-Temperature Indicators as Shelf Life Monitors of Food Products"; Journal of Food Science; vol. 54, Issue 4; Jul. 1989; pp. 783-788.
Taoukis, P. S., et al.; "Use of time-temperature integrators and predictive modelling for shelf life control of chilled fish under dynamic storage conditions"; International Journal of Food Microbiology, vol. 53; 1999; pp. 21-31.
Taoukis, Petros et al.; "Deliverable D.2.1.2 Temperature monitoring techniques and traceability systems along the cold chain";http://www.frisbee-project.eu/images/result/FRISBEE_DEL_2%201%202.pdf; Jul. 26, 2011; pp. 1-28.
Taoukis, Petros; "Deliverable D 3.2.4.4 Literature review and experimental data of frozen milk products and vegetables quality models"; http://www.frisbee-project.eu/images/result/FRISBEE_DEL_3-2-4-4.pdf; Jun. 6, 2011; pp. 1-24.
This New World By Huffpost; "Eating Ugly: The Food Waste That Could Refeed America"; https://www.facebook.com/ThisNewWorldHuffPost/videos/428476821288487; Apr. 22, 2019; pp. 1-9.
Trust in Food™; "Sustainability Research Report 2019"; https://www.zestlabs.com/downloads/Trust-In-Food-Sustainability-Survey-2019.pdf; Available as early as Jul. 18, 2019; pp. 1-19.
Wells, John H., et al.; "A Kinetic Approach to Food Quality Prediction using Full-History Time-Temperature Indicators"; Journal of Food Science; vol. 53, Issue 6; Nov. 1988; pp. 1866-1871.
Wells, John H., et al.; "A Quality-Based Inventory Issue Policy For Perishable Foods"; Journal of Food Processing & Preservation; vol. 12, Issue 4; Jan. 1989; pp. 271-292.
Wells, John Henry, et al.; "Application of Time-Temperature Indicators in Monitoring Changes in Quality Attributes of Perishable and Semiperishable Foods"; Journal of Food Science; vol. 53, Issue 1; Jan. 1988; pp. 148-152, 156.
Weston, L.A. et al.; "Preharvest Factors Affecting Postharvest Quality of Vegetables"; HortScience; vol. 32(5), Aug. 1997, pp. 812-816.
Williamson, Katie et al.; "Climate Change Needs Behavior Change"; https://www.zestlabs.com/downloads/2018-CCNBC-Report.pdf; 2018; pp. 1-22.
Zelem, MC.; "Deliverable D.2.3.1 National legal and ethical requirements forthe surveys"; http://www.frisbee-project.eu/images/result/FRISBEE_DEL_2.3.1.pdf; Jun. 23, 2011; pp. 1-68.
*Zest Labs, Inc.* v *Walmart*; Bohling, Joshua; "Transcript of the Testimony of Bohling, Joshua"; Bushman Court Reporting; Case No. 4:18-CV-00500-JM; Aug. 15-16, 2019; pp. 5-6, 47-48, 52-69, 78, 80-82, 85, 87, 98-102, 107-134, 137-145, 158-163, 182-184, 209-210, 233-234, 239-242, 246, and 357.
*Zest Labs, Inc.* v *Walmart*; Dickinson, Q. Todd; "Expert Report of Q. Todd Dickinson"; United States District Court forthe Eastern District of Arkansas; Case No. 4:18-CV-00500-JM; Oct. 29, 2019; pp. 1-33.
*Zest Labs, Inc.* v *Walmart*; Kunin, Stephen G.; "Rebuttal Expert Report of Stephen G. Kunin"; United States District Court forthe Eastern District of Arkansas; Case No. 4:18-CV-00500-JM; Nov. 25, 2019; pp. 1-38.
*Zest Labs, Inc.* v *Walmart*; Zest Labs, Inc et al.; "Complaint"; United States District Court forthe Eastern District of Arkansas; Case No. 4:18-CV-00500-JM; Aug. 1, 2018; pp. 1-26.
Zest Labs; "Blockchain for Supply Chains"; https://www.zestlabs.com/challenges/blockchain-for-supply-chains/; Available as early as Jul. 18, 2019; pp. 1-4.
Zest Labs; "Food Safety and the Supply Chain"; https://www.zestlabs.com/challenges/food-safety/; Available as early as Jul. 18, 2019; pp. 1-5.
Zest Labs; "Food Supplier Operational Efficiency"; https://www.zestlabs.com/challenges/food-supplier-operational-efficiency/; Available as early as Jul. 18, 2019; pp. 1-3.
Zest Labs; "Food Waste is a Significant Problem"; https://www.zestlabs.com/challenges/food-waste-challenge/; Available as early as Jul. 18, 2019; pp. 1-6.
Zest Labs; "Fresh Food Supply Chain"; https://www.zestlabs.com/challenges/fresh-food-supply-chain/; Available as early as Jul. 18, 2019; pp. 1-5.
Zest Labs; "Fresh Food Sustainability"; https://www.zestlabs.com/challenges/fresh-food-sustainability/; Available as early as Jul. 18, 2019; pp. 1-4.
Zest Labs; "Fresh Produce"; http://www.zestlabs.com/fresh-produce; Available as early as Oct. 21, 2017; pp. 1-14.
Zest Labs; "On-Demand Delivery"; https://www.zestlabs.com/on-demand-delivery/; Available as early as Oct. 22, 2017; pp. 1-7.
Zest Labs; "Post-Harvest Technology"; https://www.zestlabs.com/challenges/post-harvest-technology/; Available as early as Jul. 18, 2019; pp. 1-8.
Zest Labs; "The Freshest Produce"; https://www.zestlabs.com/resources; Available as early as May 2, 2018; pp. 1-16.
Zest Labs; "Zest Fresh—Deep Dive"; https://www.zestlabs.com/resources; Available as early as May 2, 2018, pp. 1-15.
Zest Labs; "Zest Fresh Differentiation"; https://www.zestlabs.com/zest-fresh-differentiation/; Available as early as Jul. 18, 2019; pp. 1-6.
Zest Labs; "Zest Fresh for Beef, Poultry, Pork and Seafood"; https://www.zestlabs.com/zest-fresh-for-protein/; Available as early as Jul. 18, 2019; pp. 1-5.
Zest Labs; "Zest Fresh for Grocers"; https://www.zestlabs.com/zest-fresh-for-produce-for-grocers/; Available as early as Jul. 18, 2019; pp. 1-13.

(56) References Cited

OTHER PUBLICATIONS

Zest Labs; "Zest Fresh for Growers, Packers, and Shippers"; https://www.zestlabs.com/zest-fresh-for-growers-and-suppliers/; Available as early as Jul. 18, 2019; pp. 1-17.

Zest Labs; "Zest Fresh for Restaurants"; https://www.zestlabs.com/zest-fresh-for-produce-for-restaurants/; Available as early as Jul. 18, 2019; pp. 1-13.

Zest Labs; "Zest Fresh Grower Testimonial"; https://www.zestlabs.com/resources; Available as early as May 2, 2018; pp. 1-13.

Zest Labs; "Zest Fresh Overview"; https://www.zestlabs.com/resources; Available as early as May 2, 2018; pp. 1-19.

Zest Labs; "Zest Fresh Use Cases"; https://www.zestlabs.com/zest-fresh-use-cases/; Available as early as Jul. 18, 2019; pp. 1-6.

Zest Labs; "Zest Fresh: Pallet-level Quality Management from Harvest to Store"; http://www.zestlabs.com/zest-fresh; Available as early as Oct. 29, 2017; pp. 1-10.

Zest Labs; "Zest Labs Overview"; https://www.zestlabs.com/resources; Available as early as Aug. 1, 2018; pp. 1-13.

Zest Labs;" . . . Not Worth a Thousand Words—Why Traditional Temperature Loggers and Imaging Technologies are Inadequate to Determine Freshness and Reduce Waste"; https://www.zestlabs.com/wp-content/uploads/2018/03/WP-05-0318-Not-Worth-A-Thousand-Words.pdf; Mar. 5, 2018; pp. 1-6.

Zest Labs; "10 Limitations of Traditional Temperature Data Loggers And Why They're No Longer Adequate forthe Cold Chain"; https://www.zestlabs.com/wp-content/uploads/2018/05/PB-04-0418-10-Limitations-of-Data-Loggers.pdf; May 4, 2018; pp. 1-3.

Zest Labs; "Before and After—The Benefits of Digital Transformation in the Fresh Food Supply Chain"; https://www.zestlabs.com/downloads/Before-and-After-Digital-Transformation.pdf; Jan. 13, 2019; pp. 1-6.

Zest Labs; "Blockchain and Achieving True Transparency—Proactively Managing Food Safety and Freshness with Blockchain and IoT Technologies"; https://www.zestlabs.com/wp-content/uploads/2018/01/WP-08-0118.Blockchain.and_.Achieving.True_.Transparency-1.pdf; Jan. 8, 2018; pp. 1-4.

Zest Labs; "Blockchain and Its Value to Suppliers"; https://www.zestlabs.com/downloads/Blockchain-and-Its-Value-to-Suppliers.pdf; Available as early as Jul. 18, 2019; pp. 1-5.

Zest Labs; "Comparing Pallet- and Trailer-level Temperature Monitoring—Implications on Quality, Freshness, Traceability and Profitability for Retail Grocers"; https://www.zestlabs.com/wp-content/uploads/2018/03/WP-04-0318-Pallet-vs-Trailer.pdf; Mar. 4, 2018; pp. 1-4.

Zest Labs; "Freshness Baseline Study—Sample Report"; http://www.zestlabs.com/wp-content/uploads/2018/03/Zest-Labs-Sample-Baseline-Report.pdf; Available as early as Mar. 2018; pp. 1-11.

Zest Labs; "Freshness Myths—False Beliefs That Lead to Food Waste"; https://www.zestlabs.com/downloads/Freshness-Myths.pdf; Aug. 7, 2018; pp. 1-5.

Zest Labs; "Half-bad Is Not Good"; https://www.zestlabs.com/downloads/Grocery-Store-Variability.pdf; Jun. 15, 2019; pp. 1-11.

Zest Labs; "Improve Operational Efficiency—Optimize Labor and Process Adherence to Reduce Costs"; https://www.zestlabs.com/downloads/Improving-Operational-Efficiency.pdf; Available as early as Jul. 18, 2019; pp. 1-3.

Zest Labs; "Improving Quality and Profitability for Retail Grocers—The Benefits of Pallet-level Monitoring for the Fresh and Perishable Food Cold Chain"; https://www.zestlabs.com/wp-content/uploads/2017/12/WP-01-1117.Improving.Quality_.and_.Profitability.for_.Retail.Grocers.pdf; Nov. 1, 2017; pp. 1-8.

Zest Labs; "Let's Start at the Beginning—Reducing Shrink Begins at Harvest"; https://www.zestlabs.com/wp-content/uploads/2018/05/WP-12-0518-Lets-Start-at-the-Beginning.pdf; May 12, 2018; pp. 1-4.

Zest Labs; "Margins Matter—Reducing Fresh Food Waste to Improve Product Margins by 6% or More"; https://www.zestlabs.com/wp-content/uploads/2018/04/WP-11-0418-Margins-Matter-1.pdf; Apr. 11, 2018; pp. 1-6.

Zest Labs; "Measuring and Managing Operational Efficiency for Growers and Suppliers"; https://www.zestlabs.com/downloads/Zest-Fresh-Metrics-Datasheet.pdf; Aug. 25, 2019; pp. 1-5.

Zest Labs; "Monitoring the Safety and Quality of Fresh, Frozen and Processed Foods"; https://www.zestlabs.com/wp-content/uploads/2016/03/IN-SB-FreshProduce_RestaurantFoodService_031016.pdf; Mar. 10, 2016; pp. 1-2.

Zest Labs; "Pallet-level Quality Management from Harvest to Store"; https://www.zestlabs.com/wp-content/uploads/2016/03/IN_SB_FoodIndustry_ProduceGrowers_031016.pdf; Mar. 10, 2016; pp. 1-2.

Zest Labs; "Poor Customer Experiences—Half-Bad is Not Good! A Shelf-Life Variability Study"; https://www.zestlabs.com/downloads/Variability-Infographic.pdf; Available as early as Jul. 2019; pp. 1-1.

Zest Labs; "Proactive Freshness Management: Modernizing the Fresh Food Supply Chain to Reduce Waste and Improve Profitability"; https://www.zestlabs.com/downloads/Proactive-Freshness-Management.pdf; Feb. 6, 2019; pp. 1-7.

Zest Labs; "Reduce Shrink, Improve Profitability and Quality for Fresh Food"; https://www.zestlabs.com/wp-content/uploads/2016/03/IN-SB-FreshProduce_RetailGrocers_031016.pdf; Mar. 10, 2016; pp. 1-3.

Zest Labs; "Shelf-life Variability Begins in the Field—Produce Pallets Harvested on the Same Day Vary by as Much as 86 Percent, Contributing to Shrink and Lost Profits"; https://www.zestlabs.com/wp-content/uploads/2018/02/WP-10-0218-Shelf-life-Variability.pdf; Feb. 10, 2018; pp. 1-4.

Zest Labs; "Strawberries—Shelf-Life Variability"; https://www.zestlabs.com/downloads/Zest-Fresh-Strawberries-Report.pdf; Available as early as Jul. 2019; pp. 1-2.

Zest Labs; "The Best of Zest 2018—A Collection of Our Most Popular Blogs"; https://www.zestlabs.com/downloads/The-Best-of-Zest-2018.pdf; Available as early as 2018; pp. 1-15.

Zest Labs; "The ZIPR Code Freshness Metric—Dynamically providing the current freshness of each pallet to help you intelligently manage product and reduce shrink throughout the fresh food supply chain"; https://www.zestlabs.com/downloads/The-ZIPR-Code.pdf; Jun. 1, 2018; pp. 1-3.

Zest Labs; "Today, You Saved $67,571—How Zest Fresh for Managing the Produce Cold Chain Reduces Waste and Saves Retailers Money . . . Beginning on Day One"; https://www.zestlabs.com/downloads/Today-You-Saved.pdf; Jun. 3, 2018; pp. 1-6.

Zest Labs; "True Transparency for Freshness Management, Food Safety, Authenticity and Traceability"; https://www.zestlabs.com/wp-content/uploads/2018/03/SO-04-0218-Zest-Fresh-for-Protein-Solution-Overview.pdf; Feb. 4, 2018; pp. 1-2.

Zest Labs; "Zest Labs FAQ and Reference Guide"; https://www.zestlabs.com/downloads/Zest-Labs-FAQ-and-Reference-Guide.pdf; Jul. 1, 2018; pp. 1-6.

Zest Labs; "Zest Labs Professional Services"; https://www.zestlabs.com/wp-content/uploads/2018/03/SO-05-0318-Zest-Labs-Professional-Services.pdf; Mar. 5, 2018; pp. 1-2.

Haard, Norman F., et al.; "Characteristics of Edible Plant Tissues"; Food Chemistry, edited by Owen R. Fennema; 3rd Ed.; Marcel Dekker, Inc.; 1996; pp. 943-1011.

Haugen, John E., et al.; "Application of gas-sensor array technology for detection and monitoring of growth of spoilage bacteria in milk: A model study"; Analytics Chimica Acta; vol. 565, No. 1; https://doi.org/10.1016/j.aca.2006.02.016; Feb. 23, 2006; pp. 10-16.

Kader, Adel A., et al.; "Technologies to Extend the Refrigerated Shelf Life of Fresh Fruit"; Food Storage Stability, edited by Irwin A. Taub, et al.; Boca Raton; CRC Press; 1998; pp. 1-27.

Kader, Adel A.; "Postharvest Technology of Horticultural Crops"; 2002; 3rd Ed.; University of California Agriculture and Natural Resources; Oakland; 56 pages.

Kader, Adel A.; "Postharvest Technology of Horticultural Crops"; 2002; 3rd Ed.; University of California Agriculture and Natural Resources; Oakland; 74 pages.

Kader, Adel A.; "Postharvest Technology of Horticultural Crops"; 2002; 3rd Ed.; University of California Agriculture and Natural Resources; Oakland; pp. 113-196.

(56) References Cited

OTHER PUBLICATIONS

Kader, Adel A.; "Postharvest Technology of Horticultural Crops"; 2002; 3rd Ed.; University of California Agriculture and Natural Resources; Oakland; pp. 197-250.
Kader, Adel A.; "Postharvest Technology of Horticultural Crops"; 2002; 3rd Ed.; University of California Agriculture and Natural Resources; Oakland; pp. 251-314.
Kader, Adel A.; "Postharvest Technology of Horticultural Crops"; 2002; 3rd Ed.; University of California Agriculture and Natural Resources; Oakland; pp. 315-384.
Kader, Adel A.; "Postharvest Technology of Horticultural Crops"; 2002; 3rd Ed.; University of California Agriculture and Natural Resources; Oakland; pp. 385-434.
Kader, Adel A.; "Postharvest Technology of Horticultural Crops"; 2002; 3rd Ed.; University of California Agriculture and Natural Resources; Oakland; pp. 435-480.
Kader, Adel A.; "Postharvest Technology of Horticultural Crops"; 2002; 3rd Ed.; University of California Agriculture and Natural Resources; Oakland; pp. 67-112.
Kong, F. et al.; "Chemical Deterioration and Physical Instability of Foods and Beverages"; The Stability and Shelf Life of Food, edited by Persis Subramaniam; 2nd Ed.; Woodhead Publishing; 2016; pp. 1-21.
Labuza, T. P., et al.; "The Relationship Between Processing and Shelf Life"; Foods forthe '90s, edited by Gordon G. Birch, et al.; Elsevier Applied Science; Aug. 1, 1990; pp. 1-21.
Robertson, Gordon L.; "Food Packaging: Principles and Practice"; 3rd Ed.; Boca Raton; CRC Press; 2013; pp. 1-33.
Singh, R. P.; "Scientific Principles of Shelf-Life Evaluation"; Shelf-Life Evaluation of Foods, edited by Dominic Man, et al.; 2nd Ed.; Aspen Publishers, Inc.; 2000; pp. 1-23.
Singh, R. Paul et al.; "Introduction to Food Engineering"; 5th Ed.; Academic Press; 2014; pp. 1-31.
Wells, John H. et al.; "Quality Management During Storage and Distribution"; Food Storage Stability, edited by Irwin A. Taub, et al.; Boca Raton; CRC Press; 1998; pp. 1-29.
Wells, John H., et al.; "Temperature Tolerance of Foods during Distribution"; Handbook of Food Engineering Practice, edited by Kenneth J. Valentas, et al.; Boca Raton; CRC Press; 1997; pp. 1-29.
Wells, John H., et al.; "The Application of Time-Temperature Indicator Technology to Food Quality Monitoring and Perishable Inventory Management"; Mathematical Modelling of Food Processing Operations, edited by Stuart Thorne; Elsevier Applied Science; 1992; pp. 1-41.
Zest Labs, Inc. v Walmart; ECF No. 002; Zest Labs, Inc. et al.; "Motion for Leave to File Complaint Under Seal and to Establish Briefing Schedule Relating to Potentially Confidential Information in Complaint"; United States District Court for the Eastern District of Arkansas; Case No. 4:18-CV-00500-JM; Aug. 1, 2018; pp. 1-4.
Zest Labs, Inc. v Walmart; ECF No. 003; Zest Labs, Inc. et al.; "Brief in Support of Motion for Leave to File Complaint Under Seal and to Establish Briefing Schedule Relating to Potentially Confidential Information Complaint"; United States District Court forthe Eastern District of Arkansas; Case No. 4:18-CV-00500-JM; Aug. 1, 2018; pp. 1-4.
Zest Labs, Inc. v. Walmart; ECF No. 035; Walmart; "Defendant's Response to Plaintiffs' Motion for Leave To File Complaint Under Seal"; United States District Court forthe Eastern District of Arkansas; Case No. 4:18-CV-00500-JM; Aug. 27, 2018; pp. 1-3.
Zest Labs, Inc. v Walmart; ECF No. 038; Zest Labs, Inc. et al.; "Plaintiffs' Reply in Support of Plaintiffs' Motion for Leave To File Complaint Under Seal"; United States District Court forthe Eastern District of Arkansas; Case No. 4:18-CV-00500-JM; Aug. 31, 2018; pp. 1-3.
Zest Labs, Inc. v Walmart; ECF No. 041; Walmart; "Defendant's Motion for Leave to File Under Seal"; United States District Court for the Eastern District of Arkansas; Case No. 4:18-CV-00500-JM; Sep. 4, 2018; pp. 1-3.
Zest Labs, Inc. v Walmart; ECF No. 098; Walmart; "Defendant's Brief in Support of Its Motion for Protective Order and to Compel Identification of Alleged Trade Secrets"; United States District Court forthe Eastern District of Arkansas; Case No. 4:18-CV-00500-JM; Feb. 11, 2019; pp. 1-29.
Zest Labs, Inc. v Walmart; ECF No. 101-01; Sammi, P. Anthony; "Exhibit A"; United States District Court forthe Eastern District of Arkansas; Case No. 4:18-CV-00500-JM; Feb. 15, 2019; pp. 1-3.
Zest Labs, Inc. v Walmart; ECF No. 101-02; Tulin, Edward L.; "Exhibit B"; United States District Court forthe Eastern District of Arkansas; Case No. 4:18-CV-00500-JM; Feb. 15, 2019; pp. 1-4.
Zest Labs, Inc. v Walmart; ECF No. 101-03; Tulin, Edward L.; "Exhibit C"; United States District Court forthe Eastern District of Arkansas; Case No. 4:18-CV-00500-JM; Feb. 15, 2019; pp. 1-5.
Zest Labs, Inc. v Walmart; ECF No. 101-04; Zest Labs, Inc. et al.; "Exhibit D Filed Under Seal Pursuant To Order Dated Sep. 7, 2018"; United States District Court forthe Eastern District of Arkansas; Case No. 4:18-CV-00500-JM; Feb. 15, 2019; 1 page.
Zest Labs, Inc. v Walmart; ECF No. 101 -05; Zest Labs, Inc. et al.; "Exhibit E Filed Under Seal Pursuant to Order Dated Sep. 7, 2018"; United States District Court forthe Eastern District of Arkansas; Case No. 4:18-CV-00500-JM; Feb. 15, 2019; 1 page.
Zest Labs, Inc. v Walmart; ECF No. 101; Zest Labs, Inc. et al.; "Plaintiffs' Brief in Opposition To Defendant's Motion for Protective Order and to Compel Identification of Trade Secrets"; United States District Court for the Eastern District of Arkansas; Case No. 4:18-CV-00500-JM; Feb. 15, 2019; pp. 1-28.
Zest Labs, Inc. v Walmart; ECF No. 102-01; Zest Labs, Inc. et al.; "Exhibit A"; United States District Court forthe Eastern District of Arkansas; Case No. 4:18-CV-00500-JM; Feb. 20, 2019; pp. 1-28.
Zest Labs, Inc. v Walmart; ECF No. 102-02; Walmart; "Exhibit B"; United States District Court forthe Eastern District of Arkansas; Case No. 4:18-CV-00500-JM; Feb. 20, 2019; pp. 1-59.
Zest Labs, Inc. v Walmart; ECF No. 102-03; Zest Labs, Inc. et al.; "Exhibit C Filed Under Seal"; United States District Court forthe Eastern District of Arkansas; Case No. 4:18-CV-00500-JM; Feb. 20, 2019; 1 page.
Zest Labs, Inc. v Walmart; ECF No. 102-04; Walmart; "Exhibit D"; United States District Court forthe Eastern District of Arkansas; Case No. 4:18-CV-00500-JM; Feb. 20, 2019; pp. 1-10.
Zest Labs, Inc. v Walmart; ECF No. 102-06; Zest Labs, Inc. et al.; "Exhibit F Filed Under Seal"; United States District Court forthe Eastern District of Arkansas; Case No. 4:18-CV-00500-JM; Feb. 20, 2019; 1 page.
Zest Labs, Inc. v Walmart; ECF No. 102-07; Zest Labs, Inc. et al.; "Exhibit G Filed Under Seal"; United States District Court forthe Eastern District of Arkansas; Case No. 4:18-CV-00500-JM; Feb. 20, 2019; 1 page.
Zest Labs, Inc. v Walmart; ECF No. 102-08; Williams, Fred I.; "Exhibit H"; United States District Court forthe Eastern District of Arkansas; Case No. 4:18-CV-00500-JM; Feb. 20, 2019; pp. 1-5.
Zest Labs, Inc. v Walmart; ECF No. 102-09; Simons, Michael; "Exhibit I"; United States District Court forthe Eastern District of Arkansas; Case No. 4:18-CV-00500-JM; Feb. 20, 2019; pp. 1-8.
Zest Labs, Inc. v Walmart; ECF No. 102-10; Williams, Fred I.; "Exhibit J"; United States District Court forthe Eastern District of Arkansas; Case No. 4:18-CV-00500-JM; Feb. 20, 2019; pp. 1-4.
Zest Labs, Inc. v Walmart; ECF No. 102-11; Simons, Michael; "Exhibit K"; United States District Court forthe Eastern District of Arkansas; Case No. 4:18-CV-00500-JM; Feb. 20, 2019; pp. 1-2.
Zest Labs, Inc. v Walmart; ECF No. 102-12; Tulin, Edward L; "Exhibit L"; United States District Court forthe Eastern District of Arkansas; Case No. 4:18-CV-00500-JM; Feb. 20, 2019; pp. 1-4.
Zest Labs, Inc. v Walmart; ECF No. 102-13; Sammi, P. Anthony; "Exhibit M"; United States District Court forthe Eastern District of Arkansas; Case No. 4:18-CV-00500-JM; Feb. 20, 2019; pp. 1-3.
Zest Labs, Inc. v Walmart; ECF No. 102-14; Sammi, P. Anthony; "Exhibit N"; United States District Court forthe Eastern District of Arkansas; Case No. 4:18-CV-00500-JM; Feb. 20, 2019; pp. 1-3.
Zest Labs, Inc. v Walmart; ECF No. 102; Zest Labs, Inc. et al.; "Plaintiffs' Motion To Compel Supplemental Responses to Interrogatories and Requests for Production From Defendant"; United States District Court forthe Eastern District of Arkansas; Case No. 4:18-CV-00500-JM; Feb. 20, 2019; pp. 1-6.

(56) References Cited

OTHER PUBLICATIONS

Zest Labs, Inc. v Walmart; ECF No. 103; Zest Labs, Inc et al.; "Plaintiffs' Brief in Support of Motion to Compel Supplemental Responses to Interrogatories and Requests for Production From Defendant"; United States District Court forthe Eastern District of Arkansas; Case No. 4:18-CV-00500-JM; Feb. 20, 2019; pp. 1-24.
Zest Labs, Inc. v Walmart; ECF No. 105-1; Walmart; "Exhibit A—Filed Under Seal Pursuant to Order Dated Sep. 7, 2018"; United States District Court forthe Eastern District of Arkansas; Case No. 4:18-CV-00500-JM; Feb. 25, 2019; 1 page.
Zest Labs, Inc. v Walmart; ECF No. 105; Walmart; "Defendant's Response to Plaintiffs' Motion To Compel"; United States District Court forthe Eastern District of Arkansas; Case No. 4:18-CV-00500-JM; Feb. 25, 2019; pp. 1-21.
Zest Labs, Inc. v Walmart; ECF No. 125; Zest Labs, Inc. et al.; "Plaintiffs' Motion to Compel Defendant Walmart to Comply With the Court's Mar. 6, 2019 Order and Otherwise Produce Technical Discovery"; United States District Court forthe Eastern District of Arkansas; Case No. 4:18-CV-00500-JM; Apr. 22, 2019; pp. 1-9.
Zest Labs, Inc. v Walmart; ECF No. 126; Zest Labs, Inc. et al.; "Plaintiffs' Brief in Support of Motion to Compel Defendant Walmart to Comply With the Court's Mar. 6, 2019 Order and Otherwise Produce Technical Discovery"; United States District Court forthe Eastern District of Arkansas; Case No. 4:18-CV-00500-JM; Apr. 22, 2019; pp. 1-21.
Zest Labs, Inc. v Walmart; ECF No. 130-1; Sammi, P. Anthony; "Zest V. Walmart: Mar. 29, 2019 M. Simons Letter to P. Sammi Re Deficient Production of Technical Documents"; United States District Court for the Eastern District of Arkansas; Case No. 4:18-CV-00500-JM; May 8, 2019; pp. 1-2.
Zest Labs, Inc. v Walmart; ECF No. 130-2; Tulin, Edward L.; "Zest V. Walmart: Deposition Notices"; United States District Court for the Eastern District of Arkansas; Case No. 4:18-CV-00500-JM; May 8, 2019; pp. 1-2.
Zest Labs, Inc. v Walmart; ECF No. 130-3; Simons, Michael; "Zest V. Walmart: Deposition Notices"; United States District Court for the Eastern District of Arkansas; Case No. 4:18-CV-00500-JM; May 8, 2019; pp. 1-3.
Zest Labs, Inc. v Walmart; ECF No. 130-4; Walmart; "Exhibit D—Filed Under Seal Pursuant to Order Dated Sep. 7, 2018"; United States District Court forthe Eastern District of Arkansas; Case No. 4:18-CV-00500-JM; May 8, 2019; 1 page.
Zest Labs, Inc. v Walmart; ECF No. 130-5; Simons, Michael; "Zest Labs V. Walmart—Walmart's Apr. 5, 2019 Production"; United States District Court for the Eastern District of Arkansas; Case No. 4:18-CV-00500-JM; May 8, 2019; pp. 1-2.
Zest Labs, Inc. v Walmart; ECF No. 130; Walmart; "Defendant's Response to Plaintiffs' Motion To Compel Compliance With the Mar. 6, 2019 Order and Technical Discovery"; United States District Court forthe Eastern District of Arkansas; Case No. 4:18-CV-00500-JM; May 8, 2019; pp. 1-26.
Zest Labs, Inc. v Walmart; ECF No. 131-1; Walmart; "Exhibit A—Filed Under Seal Pursuant To Order Dated Sep. 7, 2018"; United States District Court forthe Eastern District of Arkansas; Case No. 4:18-CV-00500-JM; May 8, 2019; 1 page.
Zest Labs, Inc. v Walmart; ECF No. 131-2; Walmart; "Exhibit B—Filed Under Seal Pursuant to Order Dated Sep. 7, 2018"; United States District Court forthe Eastern District of Arkansas; Case No. 4:18-CV-00500-JM; May 8, 2019; 1 page.
Zest Labs, Inc. v Walmart; ECF No. 131-3; Sammi, P. Anthony; "Re: 4:18-CV-00500-JM Zest Labs Inc et al V. Wal-Mart Inc"; United States District Court forthe Eastern District of Arkansas; Case No. 4:18-CV-00500-JM; May 8, 2019; 1 page.
Zest Labs, Inc. v Walmart; ECF No. 131-4; Simons, Michael; "Re: 4:18-CV-00500-JM Zest Labs Inc et al V. Wal-Mart Inc"; United States District Court forthe Eastern District of Arkansas; Case No. 4:18-CV-00500-JM; May 8, 2019; 1 page.
Zest Labs, Inc. v Walmart; ECF No. 131; Walmart; "Defendant's Sur-Reply Brief in Further Opposition to Plaintiffs' Motion to Compel"; United States District Court for the Eastern District of Arkansas; Case No. 4:18-CV-00500-JM; May 8, 2019; pp. 1-21.
Zest Labs, Inc. v Walmart; ECF No. 250; Walmart; "Defendant's Reply Brief in Support of Its Motion to Exclude Proposed Expert Testimony of Patent Attorney Q. Todd Dickinson"; United States District Court forthe Eastern District of Arkansas; Case No. 4:18-CV-00500-JM; Mar. 27, 2020; pp. 1-13.
Zest Labs, Inc. v Walmart; ECF No. 257-1; Walmart; "Defendant's Surreply in Further Opposition to Zest Labs, Inc.'s Motion for Partial Summary Judgment That Walmart Used and Disclosed Zest's Information in the Walmart Application"; United States District Court forthe Eastern District of Arkansas; Case No. 4:18-CV-00500-JM; Mar. 31, 2020; pp. 1-168.
Zest Labs, Inc. v Walmart; ECF No. 257-1; Walmart; "Defendant's Surreply in Further Opposition To Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 169-336.
Zest Labs, Inc. v Walmart; ECF No. 257-1; Walmart; "Defendant's Surreply in Further Opposition To Zest Labs, Inc.'s Motion for Partial Summary Judgment That Walmart Used and Disclosed Zest's Information in the Walmart Application"; United States District Court for the Eastern District of Arkansas; Case No. 4:18-CV-00500-JM; Mar. 31, 2020; pp. 337-342.
Zest Labs, Inc. v Walmart; ECF No. 257; Walmart; "Defendant's Motion for Leave to File Surreply in Further Opposition to Zest Labs, Inc.'s Motion for Partial Summary Judgment That Walmart Used and Disclosed Zest's Information in the Walmart Application"; United States District Court forthe Eastern District of Arkansas; Case No. 4:18-CV-00500-JM; Mar. 31, 2020; pp. 1-3.
Zest Labs, Inc. v Walmart; ECF No. 261-1; Blitzer, Rachel R.; "Declaration of Rachel R. Blitzer Regarding Walmart's Surreply in Further Opposition To Zest Labs, Inc.'s Motion for Partial Summary Judgment That Walmart Used and Disclosed Zest's Information in the Walmart Application"; United States District Court forthe Eastern District of Arkansas; Case No. 4:18-CV-00500-JM; Apr. 6, 2020; pp. 1-169.
Zest Labs, Inc. v Walmart; ECF No. 261-1; Blitzer, Rachel R.; "Declaration of Rachel R. Blitzer Regarding Walmart's Surreply in Further Opposition to Zest Labs, Inc.'s Motion for Partial Summary Judgment That Walmart Used and Disclosed Zest's Information in the Walmart Application"; United States District Court forthe Eastern District of Arkansas; Case No. 4:18-CV-00500-JM; Apr. 6, 2020; pp. 170-337.
Zest Labs, Inc. v Walmart; ECF No. 261; Walmart; "Defendant's Surreply in Further Opposition to Zest Labs, Inc.'s Motion for Partial Summary Judgment That Walmart Used and Disclosed Zest's Information in the Walmart Application"; United States District Court forthe Eastern District of Arkansas; Case No. 4:18-CV-00500-JM; Apr. 6, 2020; pp. 1-5.
Zest Labs, Inc. v Walmart; ECF No. 262; Walmart; "Brief in Support of Defendant's Motion for Summary Judgment"; United States District Court forthe Eastern District of Arkansas; Case No. 4:18-CV-00500-JM; Apr. 21, 2020; pp. 1-54.
Zest Labs, Inc. v Walmart; ECF No. 263; Walmart; "Defendant's Motion To Exclude Certain Proposed Expert Testimony of Mark Lanning"; United States District Court for the Eastern District of Arkansas; Case No. 4:18-CV-00500-JM; Apr. 21, 2020; pp. 1-6.
Zest Labs, Inc. v Walmart; ECF No. 264; Walmart; "Brief in Support of Defendant's Motion to Exclude Proposed Expert Testimony of Mark Lanning"; United States District Court for the Eastern District of Arkansas; Case No. 4:18-CV-00500-JM; Apr. 21, 2020; pp. 1-26.
Zest Labs, Inc. v Walmart; ECF No. 265; Walmart; "Defendant's Motion to Exclude Testimony of Damages Expert Stephen L. Becker, Ph.D."; United States District Court forthe Eastern District of Arkansas; Case No. 4:18-CV-00500-JM; Apr. 21, 2020; pp. 1-7.
Zest Labs, Inc. v Walmart; ECF No. 266; Walmart; "Brief in Support of Defendant's Motion to Exclude Testimony of Damages Expert Stephen L. Becker, Ph.D."; United States District Court forthe Eastern District of Arkansas; Case No. 4:18-CV-00500-JM; Apr. 21, 2020; pp. 1-22.

(56) References Cited

OTHER PUBLICATIONS

*Zest Labs, Inc.* v *Walmart*; ECF No. 267; Walmart; "Defendant's Response to Zest Labs, Inc.'s Motion for Summary Judgment That Information in Walmart's Patent Application Was Not Generally Known or Readily Ascertainable"; United States District Court forthe Eastern District of Arkansas; Case No. 4:18-CV-00500-JM; Apr. 21, 2020; pp. 1-23.
*Zest Labs, Inc.* v *Walmart*; ECF No. 268; Walmart; "Defendant's Response to Zest Labs, Inc.'s Motion for Partial Summary Judgment That Walmart Used and Disclosed Zest Labs' Information in the Walmart Applications"; United States District Court forthe Eastern District of Arkansas; Case No. 4:18-CV-00500-JM; Apr. 21, 2020; pp. 1-29.
*Zest Labs, Inc.* v *Walmart*; ECF No. 269; Walmart; "Defendant's Response to Plaintiffs' Motion to Exclude Testimony of Walmart's Damages Expert, Dr. William Choi"; United States District Court forthe Eastern District of Arkansas; Case No. 4:18-CV-00500-JM; Apr. 21, 2020; pp. 1-17.
*Zest Labs, Inc.* v *Walmart*; ECF No. 270; Walmart; "Defendant's Response to Plaintiffs' Motion to Exclude Testimony of Walmart's Technical Expert, Dr. David Dobkin, Ph.D."; United States District Court forthe Eastern District of Arkansas; Case No. 4:18-CV-00500-JM; Apr. 21, 2020; pp. 1-13.
*Zest Labs, Inc.* v *Walmart*; ECF No. 271; Walmart; "Defendant's Response to Plaintiffs' Motion to Exclude Testimony of Walmart's Technical Expert, Dr. Catherine Adams Hutt, Ph.D."; United States District Court for the Eastern District of Arkansas; Case No. 4:18-CV-00500-JM; Apr. 21, 2020; pp. 1-25.
*Zest Labs, Inc.* v *Walmart*; ECF No. 272; Walmart; "Defendant's Reply Brief in Support of Its Motion to Exclude Testimony of Damages Expert Stephen L. Becker, Ph.D."; United States District Court forthe Eastern District of Arkansas; Case No. 4:18-CV-00500-JM; Apr. 21, 2020; pp. 1-22.
*Zest Labs, Inc.* v *Walmart*; ECF No. 273; Walmart; "Defendant's Reply Brief in Support of Its Motion for Summary Judgment"; United States District Court forthe Eastern District of Arkansas; Case No. 4:18-CV-00500-JM; Apr. 21, 2020; pp. 1-56.
*Zest Labs, Inc.* v *Walmart*; ECF No. 274; Walmart; "Defendant's Reply Brief in Support of Its Motion to Exclude Proposed Expert Testimony of Mark Lanning"; United States District Court forthe Eastern District of Arkansas; Case No. 4:18-CV-00500-JM; Apr. 21, 2020; pp. 1-22.
*Zest Labs, Inc.* v *Walmart*; ECF No. 275; Zest Labs, Inc et al.; "Zest Labs Inc.'s Motion for Partial Summary Judgment That Walmart Used and Disclosed Zest's Information in the Walmart Applications"; United States District Court forthe Eastern District of Arkansas; Case No. 4:18-CV-00500-JM; Apr. 21, 2020; pp. 1-4.
*Zest Labs, Inc.* v *Walmart*; ECF No. 276; Zest Labs, Inc. et al.; "Plaintiffs' Motion To Exclude Testimony of Walmart's Expert, Dr. David P. Dobkin"; United States District Court for the Eastern District of Arkansas; Case No. 4:18-CV-00500-JM; Apr. 21, 2020; pp. 1-3.
*Zest Labs, Inc.* v *Walmart*; ECF No. 277; Zest Labs, Inc. et al.; "Brief in Support of Plaintiffs' Motion to Exclude the Testimony of Walmart's Expert Witness, Dr. David P. Dobkin"; United States District Court forthe Eastern District of Arkansas; Case No. 4:18-CV-00500-JM; Apr. 21, 2020; pp. 1-59.
*Zest Labs, Inc.* v *Walmart*; ECF No. 278; Zest Labs, Inc. et al.; "Plaintiffs' Motion To Exclude Testimony of Walmart Expert, Dr. Catherine Adams Hutt"; United States District Court forthe Eastern District of Arkansas; Case No. 4:18-CV-00500-JM; Apr. 21, 2020; pp. 1-4.
*Zest Labs, Inc.* v *Walmart*; ECF No. 279; Zest Labs, Inc. et al.; "Brief in Support of Plaintiffs' Motion to Exclude the Testimony of Walmart's Expert Witness, Dr. Catherine Adams Hutt"; United States District Court forthe Eastern District of Arkansas; Case No. 4:18-CV-00500-JM; Apr. 21, 2020; pp. 1-64.
*Zest Labs, Inc.* v *Walmart*; ECF No. 280; Zest Labs, Inc. et al.; "Zest Labs Inc.'s Motion for Partial Summary Judgment That Information in Walmart's Patent Application Was Not Generally Known or Readily Ascertainable"; United States District Court forthe Eastern District of Arkansas; Case No. 4:18-CV-00500-JM; Apr. 21, 2020; pp. 1-4.
*Zest Labs, Inc.* v *Walmart*; ECF No. 281; Zest Labs, Inc. et al.; "Plaintiffs' Motion to Exclude Testimony of Walmart's Damages Expert, Dr. William Choi"; United States District Court forthe Eastern District of Arkansas; Case No. 4:18-CV-00500-JM; Apr. 21, 2020; pp. 1-4.
*Zest Labs, Inc.* v *Walmart*; ECF No. 282; Zest Labs, Inc. et al.; "Plaintiffs' Brief in Support of Motion to Exclude Testimony of Walmart's Damages Expert, Dr. William Choi"; United States District Court for the Eastern District of Arkansas; Case No. 4:18-CV-00500-JM; Apr. 21, 2020; pp. 1-30.
*Zest Labs, Inc.* v *Walmart*; ECF No. 283; Zest Labs, Inc. et al.; "Zest Labs Inc.'s Brief in Support of Its Motion for Partial Summary Judgment That Information in Walmart's Patent Application Was Not Generally Known or Readily Ascertainable"; United States District Court for the Eastern District of Arkansas; Case No. 4:18-CV-00500-JM; Apr. 21, 2020; pp. 1-159.
*Zest Labs, Inc.* v *Walmart*; ECF No. 284; Zest Labs, Inc. et al.; "Zest Labs Inc.'s Brief in Support of Its Motion for Partial Summary Judgment That Walmart Used and Disclosed Zest Labs' Information in the Walmart Applications"; United States District Court forthe Eastern District of Arkansas; Case No. 4:18-CV-00500-JM; Apr. 21, 2020; pp. 1-165.
*Zest Labs, Inc.* v *Walmart*; ECF No. 285; Zest Labs, Inc. et al.; "Zest Labs Inc.'s Motion for Summary Judgment on Its Claim for Breach of Contract"; United States District Court for the Eastern District of Arkansas; Case No. 4:18-CV-00500-JM; Apr. 21, 2020; pp. 1-3.
*Zest Labs, Inc.* v *Walmart*; ECF No. 286; Zest Labs, Inc. et al.; "Zest Labs Inc.'s Brief in Support of Its Motion for Summary Judgment on Its Claim for Breach of Contract"; United States District Court forthe Eastern District of Arkansas; Case No. 4:18-CV-00500-JM; Apr. 21, 2020; pp. 1-30.
*Zest Labs, Inc.* v *Walmart*; ECF No. 287; Zest Labs, Inc. et al.; "Plaintiffs' Response To Defendant's Motion for Summary Judgment"; United States District Court forthe Eastern District of Arkansas; Case No. 4:18-CV-00500-JM; Apr. 21, 2020; pp. 1-138.
*Zest Labs, Inc.* v *Walmart*; ECF No. 288; Zest Labs, Inc. et al.; "Plaintiffs' Opposition to Defendant's Motion to Exclude Testimony of Damages Expert Stephen L. Becker, Ph.D."; United States District Court forthe Eastern District of Arkansas; Case No. 4:18-CV-00500-JM; Apr. 21, 2020; pp. 1-63.
*Zest Labs, Inc.* v *Walmart*; ECF No. 289; Zest Labs, Inc. et al.; "Plaintiffs' Brief in Opposition of Defendant's Motion to Exclude Proposed Expert Testimony of Patent Attorney Q. Todd Dickinson"; United States District Court forthe Eastern District of Arkansas; Case No. 4:18-CV-00500-JM; Apr. 21, 2020; pp. 1-180.
*Zest Labs, Inc.* v *Walmart*; ECF No. 290; Zest Labs, Inc. et al.; "Plaintiffs' Brief in Opposition of Defendant's Motion to Exclude Proposed Expert Testimony of Mark Lanning"; United States District Court forthe Eastern District of Arkansas; Case No. 4:18-CV-00500-JM; Apr. 21, 2020; pp. 1-62.
*Zest Labs, Inc.* v *Walmart*; ECF No. 291; Zest Labs, Inc. et al.; "Zest Labs Inc.'s Reply Brief in Support of Its Motion for Partial Summary Judgment That Information in Walmart's Patent Application was Not Generally Known or Readily Ascertainable"; United States District Court for the Eastern District of Arkansas; Case No. 4:18-CV-00500-JM; Apr. 21, 2020; pp. 1-18.
*Zest Labs, Inc.* v *Walmart*; ECF No. 292; Zest Labs, Inc. et al.; "Plaintiffs' Reply in Support of Their Motion to Exclude Testimony of Walmart's Damages Expert Dr. William Choi"; United States District Court forthe Eastern District of Arkansas; Case No. 4:18-CV-00500-JM; Apr. 21, 2020; pp. 1-20.
*Zest Labs, Inc.* v *Walmart*; ECF No. 293; Zest Labs, Inc. et al.; "Brief in Support of Plaintiffs' Motion to Exclude the Testimony of Walmart's Expert Witness, Dr. David P. Dobkin"; United States District Court forthe Eastern District of Arkansas; Case No. 4:18-CV-00500-JM; Apr. 21, 2020; pp. 1-13.
*Zest Labs, Inc.* v *Walmart*; ECF No. 294; Zest Labs, Inc. et al.; "Zest Labs Inc.'s Reply in Support of Their Motion for Partial Summary Judgment That Walmart Used and Disclosed Zest's Information in

(56) References Cited

OTHER PUBLICATIONS the Walmart Application"; United States District Court for the Eastern District of Arkansas; Case No. 4:18-CV-00500-JM; Apr. 21, 2020; pp. 1-39.
*Zest Labs, Inc.* v *Walmart*; ECF No. 295; Zest Labs, Inc. et al.; "Plaintiffs' Reply in Support of Their Motion To Exclude the Testimony of Walmart's Expert Witness, Dr. Catherine Adams Hutt"; United States District Court for the Eastern District of Arkansas; Case No. 4:18-CV-00500-JM; Apr. 21, 2020; pp. 1-23.
*Zest Labs, Inc.* v *Walmart*; ECF No. 296; Zest Labs, Inc. et al.; "Plaintiffs' Objections To and Motion to Strike Evidence Cited in Walmart's Responses to Zest Labs, Inc.'a Statement of Material Facts in Support of Its Motions for Partial for Summary Judgement and Motion for Summary Judgment"; United States District Court for the Eastern District of Arkansas; Case No. 4:18-CV-00500-JM; Apr. 21, 2020; pp. 1-5.
*Zest Labs, Inc.* v *Walmart*; ECF No. 297; Zest Labs, Inc. et al.; "Plaintiffs' Memorandum in Support of Objections to and Motion to Strike Evidence Cited in Walmart's Responses to Zest Labs, Inc.'s Statement of Material Facts in Support of Its Motions for Partial for Summary Judgement and Motion for Summary Judgment"; United States District Court for the Eastern District of Arkansas; Case No. 4:18-CV-00500-JM; Apr. 21, 2020; pp. 1-5.
*Zest Labs, Inc.* v *Walmart*; ECF No. 298; Walmart; "Defendant's Consolidated Brief in Opposition To Plaintiffs' Objections to and Motions to Strike Evidence Cited by Walmart in Connection With Summary Judgment Motions (Dkts. 222 & 248)"; United States District Court for the Eastern District of Arkansas; Case No. 4:18-CV-00500-JM; May 4, 2020; pp. 1-18.
3M; "3M MonitorMark Time Temperature Indicators"; https://www.3m.com/3M/en_US/company-us/all-3m-products/~/MONMARK-3M-MonitorMark-Time-Temperature-Indicators/?N=5002385+3293785721&rt=rud; Available at least as early as Feb. 7, 2019; pp. 1-4.
Agrofresh; "FreshCloud™ Storage Insights helps you monitor fruit in storage for added peace of mind"; https://www.agrofresh.com/technologies/freshcloud/storage-insights/; Available at least as early as Feb. 7, 2019; pp. 1-4.
Ahearn, Brianna; "Kroger Wins For Food Temperature Innovation"; https://www.retailsupplychaininsights.com/doc/kroger-wins-for-food-temperature-innovation-0001; Jun. 4, 2015; pp. 1-2.
Ambrosus; "Decentralised IoT Networs for Next-Generation Supply Chains"; https://ambrosus.com/#home; Available at least as early as Feb. 7, 2019; pp. 1-12.
Anzilotti, Eillie; "These High-Tech Sensors Track Exactly How Fresh Our Produce Is So We Stop Wasting Food"; https://www.fastcompany.com/40424163/these-high-tech-sensors-track-exactly-how-fresh-our-produce-is-so-we-stop-wasting-food; May 26, 2017; pp. 1-3.
Bedard, Jean; "Temperature Mapping of Storage Areas"; Technical supplement to WHO Technical Report Series, No. 961,2011; WHO Press, World Health Organization; available at least as early as Jan. 2014; pp. 1-25.
Bevan et al.; "Storage of Organically Produced Crops"; https://orgprints.org/8241/1/Storage_organic_produce_report.pdf; Dec. 1997; pp. 1-227.
BT9 Intelligent Supply Chain Solutions; "Multi Segment, Real Time, Cold Chain Perishable Information"; http://www.bt9-tech.com; Published 2018; pp. 1-6.
Business Wire; "Emerson Expands Global Capabilities in Fresh Food Monitoring with Acquisitions of Locus Traxxand PakSense"; https://www.businesswire.com/news/home/20160830005136/en/Emerson-Expands-Global-Capabilities-Fresh-Food-Monitoring; Aug. 30, 2016; pp. 1-2.
Cao, Jordan; "Intelligent Container—powered by SAP Hana"; https://blogs.saphana.com/2018/09/27/intelligent-container-powered-sap-hana/; Sep. 27, 2018; pp. 1-5.
Carrefour Group; "Carrefour launches Europe's first food blockchain"; http://www.carrefour.com/current-news/carrefour-launches-europes-first-food-blockchain; Mar. 6, 2018; pp. 1-2.

compact.net; "Inspection Planning / Quality Inspection / SPC / LIMS"; https://www.caq.de/en/Software/InspectionPlanning_QualityInspection_SPC; available at least as early as Jan. 27, 2017; pp. 1-4.
De Troch, Stefan; "Item-level cold chain monitoring, another cool NFC solution"; https://blog.nxp.com/internet-of-things-2/item-level-cold-chain-monitoring-another-cool-nfc-solution; Aug. 30, 2016; pp. 1-5.
Digi; "Digi Honeycomb Keeping food safe just got easier and cheaper. Digi Honeycomb lets you monitor your entire Cold Chain System"; https://s3.amazonaws.com/telusdigital-marketplace-production/iot/user-content/product/64aa-o.pdf; Available at least as early as Feb. 7, 2019; pp. 1-2.
DJI Ferntech; "Drones For Agriculture"; https://www.djistore.co.nz/agriculture; Available at least as early as Feb. 7, 2019; pp. 1-13.
Ecoark Holdings, Inc.; "Ocean Mist Farms Selects Zest Fresh to Optimize Freshness Management"; https://www.globenewswire.com/news-release/2018/12/04/1661680/0/en/Ocean-Mist-Farms-Selects-Zest-Fresh-to-Optimize-Freshness-Management.html; Dec. 4, 2018; pp. 1-3.
Emerson; "ProAct Services and ProAct Transport"; https://www.emerson.com/en-us/commercial-residential/proact; Available at least as early as Feb. 7, 2019; pp. 1-4.
Emerson; "Real-Time Temperature & Location Trackers"; https://climate.emerson.com/en-us/products/controls-monitoring-systems/cargo-tracking-monitoring/trackers; Available at least as early as Feb. 7, 2019; pp. 1-4.
Emerson; "Supply Chain Data Loggers"; https://climate.emerson.com/en-us/products/controls-monitoring-systems/cargo-tracking-monitoring/loggers; Available at least as early as Feb. 7, 2019; pp. 1-4.
Eom, Ki-Hwan, et al.; "The Meat Freshness Monitoring System Using the Smart RFID Tag"; International Journal of Distributed Sensor Networks, vol. 2014; http://journals.sagepub.com/doi/10.1155/2014/591812; Jul. 9, 2014; pp. 1-10.
Fast Casual; "Wireless temperature-monitoring, tracking solution available for shipping perishable goods"; https://www.fastcasual.com/news/wireless-temperature-monitoring-and-tracking-solution-now-available-for-shipping-perishable-goods/; Aug. 15, 2017; pp. 1-10.
Food and Agriculture Organization of the United Nations; "Flying robots for food security"; http://www.fao.org/zhc/detail-events/en/c/428256; Aug. 10, 2016; pp. 1-3.
FRESHAI; "AI-powered waste reduction for smart food businesses."; http://freshai.farmsteadapp.com/; Available as early as Feb. 7, 2019; pp. 1-5.
freshfruitportal.com; "Zest Labs fights food waste by routing pallets according to real-time freshness"; https://www.freshfruitportal.com/news/2018/07/19/technology-zest-labs-food-waste-profits-sensors; Jul. 19, 2018; pp. 1-5.
Friedman, Phil; "AI, machine learning, and more efficient routing"; https://www.omnitracs.com/blog/ai-machine-learning-and-more-efficient-routing; Jun. 28, 2018; pp. 1-6.
Gabbett, Rita Jane; "Amazon using artificial intelligence to monitor food safety issues"; http://www.micausa.org/amazon-using-artificial-intelligence-monitor-food-safety-issues/; May 9, 2018; pp. 1-3.
Grand View Research; "Cold Chain Market Size Worth $447.50 Billion By 2025 | CAGR: 15.1%"; https://www.grandviewresearch.com/press-release/global-cold-chain-market; Mar. 2019; pp. 1-10.
Greenwalt, Megan; "Acquisition Leads to New, Fresh Food Waste Solution"; https://www.waste360.com/mergers-and-acquisitions/acquisition-leads-new-fresh-food-waste-solution; Aug. 15, 2018; pp. 1-6.
Greis, Noel P.; "Monitoring the 'Cool Chain' Maximizing Shelf Life for Safer Food"; https://atecentral.net/r20093/case_study_monitoring_the_cool_chain; National Science Foundation; published on Dec. 2011; pp. 1-9.
Hagen, Christian et al.; "A Fresh Look: Perishable Supply Chains Go Digital"; https://www.atkearney.com/operations-performance-transformation/article?/a-fresh-look-perishable-supply-chains-go-digital; Available at least as early as Feb. 7, 2019; pp. 1-22.
Harvard Business Review; "How Blockchain Will Accelerate Business Performance and Power the Smart Economy"; https://hbr.org/

(56) References Cited

OTHER PUBLICATIONS sponsored/2017/10/how-blockchain-will-accelerate-business-performance-and-power-the-smart-economy; Oct. 27, 2017; pp. 1-8.
Hsu, Jenny W.; "Freshippo Customers Can Track Farm-To-Shelf Journey for Food"; https://www.alizila.com/hema-food-tracking/; Aug. 7, 2018; pp. 1-6.
Husseini, Talal; "Walmart's 'Eden' artificial intelligence technology to inspect fresh food for spoilage"; https://www.foodprocessing-technology.com/news/walmarts-eden-artificial-intelligence-technology-inspect-fresh-food-spoilage; Mar. 2, 2018; pp. 1-4.
IBM; "Take your food data further with Fresh Insights for IBM Food Trust"; https://www.ibm.com/blockchain/solutions/food-trust/freshness; Available at least as early as Feb. 7, 2019; pp. 1-3.
IBM; "Focus on Food Safety"; https://www.ibm.com/downloads/cas/ZN9EWKRQ; Available at least as early as 2018; pp. 1-2.
Impact Vision; "Non-invasive, real time food quality information"; https://www.impactvi.com/; Available at least as early as Feb. 7, 2019; pp. 1-18.
Impinj; "Hy-Vee Grocery Automates Cold Chain Monitoring"; https://www.impinj.com/library/customer-stories/hy-vee-cold-chain-monitoring-increases-shelf-life/; Available as early as Feb. 7, 2019; pp. 1-3.
Infratab; "Products"; https://infratab.com/products/; Available at least as early as Feb. 7, 2019; pp. 1-2.
Intel; "Intelligent Dynamic Store Merchandising Solution Cuts Losses on Perishables and Raises Brand Awareness"; Available at least as early as Feb. 7, 2019; pp. 1-12.
IQA Team; "Material Inspection Using a Cloud Software"; http://Mqalims.com/wp-content/uploads/2015/02/MAT_INSP.pdf; available at least as early as Jan. 27, 2017; pp. 1-5.
Jedermann, Reiner, et al.; "Semi-passive RFID and Beyond: Steps Towards Automated Quality Tracing in the Food Chain"; Inderscience Enterprises Ltd.; Int. J. Radio Frequency Identification Technology and Applications, vol. 1, No. 3; published in 2007; pp. 247-259.
Kroger; "Kroger Gets HarvestMark Allows consumers to trace the origin of salads"; https://www.cspdailynews.com/foodservice/kroger-gets-harvestmark; Oct. 29, 2009; pp. 1-11.
Marvin, Rob; "Blockchain: The Invisible Technology That's Changing the World"; https://in.pcmag.com/amazon-web-services/112363/blockchain-the-invisible-technology-thats-changing-the-world; Aug. 30, 2017; pp. 1-29.
Mazur, Michal; "Six Ways Drones Are Revolutionizing Agriculture"; https://www.technologyreview.com/s/601935/six-ways-drones-are-revolutionizing-agriculture; Jul. 20, 2016; pp. 1-5.
Mipsis; "Quality Control Inspection Software"; http://www.mipsis.com/QualityInspectionSoftware.html; available at least as early as Jan. 27, 2017; pp. 1-3.
Mitrokotsa et al.; "Integrated RFID and Sensor Networks: Architectures and Applications"; https://pdfs.semanticscholar.org/e5b0/c2a44971bad209cbf66afb6c825f89792723.pdf; Jun. 22, 2009; pp. 511-536.
Moorthy, Rahul et al.; "On-Shelf Availability in Retailing"; vol. 116—No. 23; International Journal of Computer Applications; Apr. 2015; pp. 47-51.
Moorthy, Rahul, et al.; "On-Shelf Availability in Retailing"; vol. 116—No. 23; International Journal of Computer Applications; available at least as early as Apr. 2015; pp. 47-51.
Musani, Parvez; "Eden: The Tech That's Bringing Fresher Groceries to You"; https://blog.walmart.com/innovation/20180301/eden-the-tech-thats-bringing-fresher-groceries-to-you; Mar. 1, 2018; pp. 1-4.
My Devices; "Alibaba Cloud and myDevices Partner to Launch Turnkey IoT Solutions in China"; https://mydevices.com/newspost/alibaba-cloud-mydevices-partner-launch-turnkey-iot-solutions-china/; Sep. 11, 2018; pp. 1-3.
Oracle; "Oracle Unveils Business-Ready Blockchain Applications"; https://www.oracle.com/nz/corporate/pressrelease/oow18-oracle-blockchain-applications-cloud-2018-10-23.html; Oct. 23, 2018; pp. 1-4.
Palanza, Rich; "IoT Monitoring: Rapidly Deliver on the Promise of IoT"; https://business.weather.com/blog/iot-monitoring-rapidly-deliver-on-the-promise-of-iot; May 16, 2018; pp. 1-4.
Peterson, Hayley; "Walmart is saving $2 billion with a machine called 'Eden' that inspects food and knows when it will spoil"; https://www.businessinsider.in/walmart-is-saving-2-billion-with-a-machine-called-eden-that-inspects-food-and-knows-when-it-will-spoil/articleshow/63127641.cms; Mar. 1, 2018; pp. 1-12.
Pridevel; "IoT Cold Chain Monitoring"; http://www.pridevel.com/sap-iot-cold-chain-monitoring; Available at least as early as Feb. 7, 2019; pp. 1-3.
QA; "Carrefour and SGS Launch Visual Trust in China"; https://www.qualityassurancemag.com/article/carrefour-and-sgs-launch-visual-trust-in-china/; Sep. 28, 2017; pp. 1-4.
QC One; "Inspect. Report. Analyze. Quality Control Software for Fresh Produce"; http://qcone.com/en/; available at least as early as May 29, 2017; pp. 1-2.
Ripple News Tech Staff; "Alibaba is Using Blockchain to Improve Consumer Confidence and Fight Food Fraud"; https://ripplenews.tech/2018/05/03/alibaba-is-using-blockchain-to-improve-consumer-confidence-and-fight-food-fraud/; May 3, 2018; pp. 1-7.
Ryan, John M.; "Guide to Food Safety and Quality During Transportation: Controls, Standards and Practices"; Academic Press; available at least as early as 2014; pp. 1-8.
SenseFly; "Why Use Agriculture Drones?"; https://www.sensefly.com/industry/agricultural-drones-industry; Available at least as early as Feb. 7, 2019; pp. 1-15.
SenseGrow; "Supply Chain Monitoring with Real-time IoT Platform"; http://www.sensegrow.com/blog/supply-chain-monitoring; May 10, 2018; pp. 1-5.
Smart Sense; "Supermarket Remote Monitoring Solutions"; https://www.smartsense.co/industries/retail/supermarkets; Available at least as early as Feb. 7, 2019; pp. 1-6.
Smilo; "The latest generation hybrid blockchain platform"; https://smilo.io/files/Smilo_White_Paper_V1.8.1.pdf; Available at least as early as Feb. 7, 2019; pp. 1-33.
SoftExpert; "SE Inspection Incoming/Outgoing Goods Inspection and Supplier Management"; https://softexpert.com/inspection-evaluation-goods.php; available at least as early as Jan. 27, 2017; pp. 1-3.
Springer, Jon; "Walmart, Kroger join suppliers in blockchain food safety initiative"; https://www.supermarketnews.com/news/walmart-kroger-join-suppliers-blockchain-food-safety-initiative; Aug. 22, 2017; pp. 1-4.
TCS Worldwide; "TCS Cargo Monitoring Solution: Track freshness of perishable cargo"; https://www.tcs.com/cargo-monitoring-solution; Available at least as early as Feb. 7, 2019; pp. 1-7.
TE-Food; "TE-Food Partners with Halal Trail Bringing Halal Food Companies to the Blockchain"; https://www.reuters.com/brandfeatures/venture-capital/article?id=38153; May 31, 2018; pp. 1-6.
Tech Mahindra; "Cold Chain Monitoring"; https://www.techmahindra.com/services/NextGenSolutions/DES/Solutions/Cold_Chain_Monitoring.aspx; Available at least as early as Feb. 7, 2019; pp. 1-4.
Tech Mahindra; "Farm to fork"; https://www.techmahindra.com/services/NextGenSolutions/DES/Solutions/Farm_to_fork.aspx; Available at least as early as Feb. 7, 2019; pp. 1-2.
Teijin—Human Chemistry, Human Solutions, Teijin's RFID Smart Shelf-Management System Used for Mass Document Management. Retrieved online at: http://www.teijin.com/news/2014/ebd140307_11.html. 2 pages, Mar. 7, 2014.
The NeWave® Smart Inventory Managment System: Take Your Management to the Next Level, NeWave Sensor Solutions Innovation Center, Oct. 7, 2016; pp. 1-2.
Tive; "A Complete Supply Chain Visibility System"; https://tive.co/product; Available at least as early as Feb. 7, 2019; pp. 1-7.
Tive; "Environmental Monitoring for Perishables"; https://tive.co/solution/environmental-monitoring-for-perishables/; Available at least as early as Feb. 7, 2019; pp. 1-5.
TraQtion; "TraQtion's Supply Chain Solution Manages Global Food Supplier Compliance and Audits"; https://www.traqtion.com/documents/TraQtion-Costco.pdf; Available as early as Feb. 7, 2019; pp. 1-2.

(56) References Cited

OTHER PUBLICATIONS

Trimble; "Trimble Acquires HarvestMark to Provide Food Traceability and Quality Control"; https://www.prnewswire.com/news-releases/trimble-acquires-harvestmark-to-provide-food-traceability-and-quality-control-300070050.html; Apr. 22, 2015; pp. 1-6.
Tsenso; "The Fresh Index: A Real-Time Shelf Life Indicator"; https://tsenso.com/en/freshindex-instead-of-bestbefore; Available at least as early as Feb. 7, 2019; pp. 1-5.
United States Army Medical Command; "U.S. Army Veterinary Command Guidelines and Procedures"; https://www.dla.mil/Portals/104/Documents/TroopSupport/Subsistence/Rations/qapubs/medcom/40-13.pdf; Feb. 13, 2006; pp. 1-171.
Verigo; "Introducing Pod Quality Continuous Product Life Data, From Farm to Store"; https://www.farmtoforkfresh.com/; Available at least as early as Feb. 7, 2019; pp. 1-8.
Wageningen UR Food & Biobased Research; "Food & Biobased Research"; https://www.worldfoodinnovations.com/userfiles/documents/FBR%20Corporate%20Brochure.pdf; Jul. 2014; pp. 1-24.
Whelan, Jenny; "Kelsius to Install FoodCheck Monitoring System In SuperValu and Centra Stores"; https://www.checkout.ie/kelsius-signs-deal-to-put-foodcheck-monitoring-system-in-supervalu-and-centra-stores/; Aug. 6, 2015; pp. 1-4.
Wynne-Jones, Stephen; "Maxima Group Unveils 'Electronic Nose' to Track Freshness"; https://www.esmmagazine.com/maxima-group-unveils-elecrtronic-nose-track-freshness/29589; Jul. 5, 2016; pp. 1-4.
Xinfin; "Enterprise Ready Hybrid Blockchain for Global Trade and Finance"; https://www.xinfin.org; Available at least as early as Feb. 7, 2019; pp. 1-13.
Yan, Lu, et al.; "The Internet of Things: From RFID to the Next-Generation Pervasive Networked Systems"; Auerbach Publications; New York; available at least as early as 2008; pp. 1-35.
Yiannas, Frank; "How Walmart's SPARK Keeps Your Food Fresh"; https://blog.walmart.com/sustainability/20150112/how-walmarts-spark-keeps-your-food-fresh; Jan. 12, 2015; pp. 1-16.
Zest Labs; "Zest Fresh for Growers, Retailers and Restaurants"; https://www.zestlabs.com/zest-fresh-for-produce/; Available at least as early as Feb. 7, 2019; pp. 1-7.
Andrew Wilson, "Vision Software Blends into Food Processing", Jun. 1, 2012, pp. 1-13.
National Geographic Society, Season, Sep. 22, 2016 (Year: 2016).
ReFED; "Retail Food Waste Action Guide"; https://www.refed.com/downloads/Retail_Guide_Web.pdf; 2018; pp. 1-44.
S. Mandal et al., "Optimal production inventory policy for defective items with fuzzy lime period", Science Direct, Applied Mathematical modelling, vol. 34, Issue 3, Mar. 2010, pp. 1-27.
S. Ren, K. He, R. Girshick, and J. Sun. Faster R-CNN: Towards real-time object detection with region proposal networks. In NIPS, 2015. (Year: 2015); pp. 1-9.
Zest Labs; "On-demand meal quality visibility from the restaurant to consumer delivery"; https://www.zestlabs.com/zest-delivery/; Available as early as Oct. 22, 2017; pp. 1-7.
USPTO; U.S. Appl. No. 16/526,677; Notice of Allowance and Fees Due (PTOL-85) dated Jun. 8, 2022; (pp. 1-6).
USPTO; U.S. Appl. No. 16/036,456; Notice of Allowance and Fees Due (PTOL-85) dated Jun. 13, 2022; (pp. 1-3).

\* cited by examiner

SYSTEMS AND METHODS FOR CONDITION COMPLIANCE

CROSS-REFERENCE TO RELATED APPLICATION

This application claims the benefit of U.S. Provisional Application No. 62/744,766, filed Oct. 12, 2018, which is incorporated by reference in its entirety herein.

TECHNICAL FIELD

This invention relates generally to the transport of goods and, more particularly, to monitoring condition compliance during the transport of goods.

BACKGROUND

Many products are in transit for a period of time before they arrive at a retail facility to be offered for sale. This period of time may be short (e.g., a number of hours) or long (e.g., a number of months). Additionally, products may sit a distribution center or in a stock room for a period of time before they are offered for sale. This period of time may be short or long. Dependent upon the type of the product, certain conditions must be maintained during transit and storage. For example, refrigerated items must be kept within specified temperature ranges to prevent spoilage. Maintaining the products, or the environment in which the products are transported/stored, with respect to a necessary or desired condition is generally referred to as condition compliance. Typically, condition compliance is monitored with a sensor located within a delivery vehicle or storage location. While such condition compliance is helpful in determining whether the appropriate conditions have been maintained, it may only indicate whether the condition was maintained near the sensor. This is problematic if the area in which the products are located is configured in such a way that conditions vary throughout the area. Consequently, better systems are needed to monitor condition compliance.

BRIEF DESCRIPTION OF THE DRAWINGS

Disclosed herein are embodiments of systems, apparatuses, and methods pertaining to monitoring condition compliance. This description includes drawings, wherein.

Figure 1:
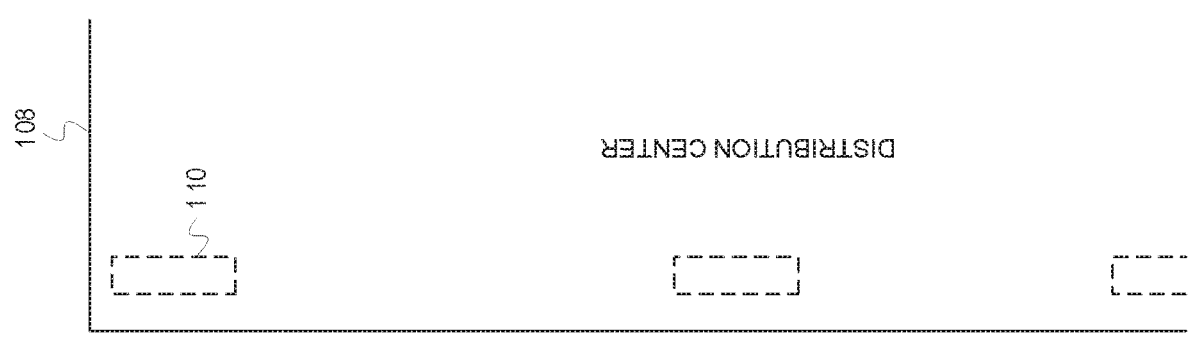
FIG. 1 depicts a delivery vehicle 100 transporting containers 102 to a distribution center 108, according to some embodiments.
Figure 1:
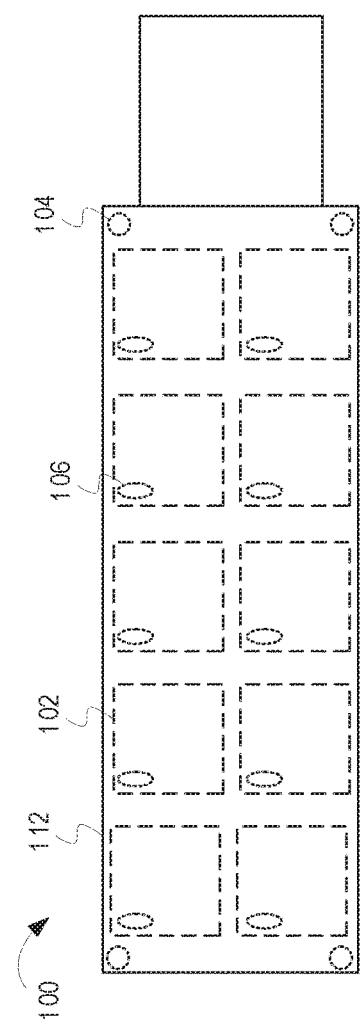

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to monitoring condition compliance. In some embodiments, a system for monitoring condition compliance comprises a child device, wherein the child device is configured to be incorporated with a container housing a product, the child device comprising a child device sensor, wherein the child device sensor is configured to capture condition data associated with the product, a child device memory, wherein the child device memory is configured to store the condition data associated with the product, a child device transmitter, wherein the child device transmitter is configured to transmit the condition data associated with the product, and a control circuit, wherein the control circuit is configured to cause transmission, via the child device transmitter, of a discovery message, receive, from other devices via the child device transmitter, acknowledgment messages, determine, based on the acknowledgment messages, if the discovery message reached a parent device, if the discovery message reached a parent device, cause transmission of the condition data associated with the product to the parent device, and if the discovery message did not reach a parent device, determine, from the other devices, one of the other devices that is furthest from the child device, and cause transmission of the condition data associated with the product to the one of the other devices furthest from the child device, and the parent device, the parent device configured to store condition data received from a plurality of child devices, and transmit, to a master device, the condition data received from the plurality of child devices.

As previously discussed, monitoring condition compliance is important to retailers. As one example, it is important that appropriate conditions are maintained when transporting perishables and storing perishables before sale. Not only is it costly when condition compliance is not maintained (e.g., if products are no longer fit for sale due to a lack of condition compliance and must be discarded), but it can also be unsafe for customers (e.g., if a customer consumes a product that is not safe for consumption due to a lack of condition compliance). Described herein, are systems, methods, and apparatuses to aid in monitoring condition compliance.

In one embodiment, the systems, methods, and apparatuses include three types of devices: 1) child devices, 2) parent devices, and 3) master devices. The child devices include sensors to capture condition data. The child devices can be deployed at a product level or for multiple products (e.g., a package, pallet, etc.). The child devices transmit the condition data to the parent devices. The parent devices are located in a cargo area of a delivery vehicle. When the delivery vehicle reaches its destination, or a location along the route to its destination, the parent devices transmit the condition data received from the child devices to a master device located at the destination, or the location on the route to the destination.

Because the child devices are located throughout the cargo area of the delivery vehicle, the child devices can better capture conditions across the cargo area of the delivery vehicle. Additionally, because the parent devices transmit the condition data to the master device, as opposed to the child devices transmitting the condition data directly to the master device, the master device is less likely to be overwhelmed by the transmissions. The discussion of FIG. 1 provides background regarding such a system.

FIG. 1 depicts a delivery vehicle 100 transporting containers 102 to a distribution center 108, according to some embodiments. The delivery vehicle 100 includes a cargo area 112. Although the delivery vehicle 100 depicted in FIG. 1 is of the truck and trailer variety, embodiments are not so limited. For example, the delivery vehicle 100 can be any suitable type of terrestrial vehicle (e.g., car, train, etc.), nautical vehicle (e.g., a boat, ship, etc.), or an aerial vehicle (e.g., a helicopter, plane, etc.). Additionally, the cargo area 112 need not be distinct from the rest of the delivery vehicle 100. For example, the cargo area 112 of a van-type delivery vehicle may not be separated from other areas of the van.

The containers 102 are located in the cargo area 112. The containers 102 can house a single product (e.g., the containers 102 can be packaging for a product) or multiple products (e.g., the containers 102 can be boxes or crates housing a number of products, pallets, etc.). Child devices 106 are incorporated with the containers 102. For example, if the containers 102 are boxes housing a number of products, the child devices 106 can be located within, under, near, etc. the boxes. If the containers 102 are product packaging, the child devices 106 can be located within, under, near, etc. the product packaging.

The child devices 106 include sensors (i.e., child device sensors). The sensors are configured to capture condition data associated with the container (i.e., one or more products housed in the containers 102). The sensors can be of any suitable type (e.g., temperature sensors (i.e., thermometers), humidity sensors, light sensors, orientation sensors (e.g., gyroscopes), moisture sensors, weight sensors, magnetic field sensors, electrical sensors, etc.) and can be a combination of multiple types of sensors. Accordingly, the sensors can capture any desired type of condition data (e.g., temperature, humidity, light exposure, orientation, the presence of moisture, weight data, magnetic field data, electrical data, etc.). The sensors can capture the condition data with any suitable frequency (e.g., continuously, every minute, every five minutes, every 30 minutes, every hour, every day, etc.). Additionally, in some embodiments, the frequency with which condition data is captured may be dependent upon the type of condition monitored.

The child devices 106 store the condition data captured by the sensors. In some embodiments, the child devices 106 can store condition data for the length of the journey. In other embodiments, the child devices 106 may only store, or be capable of storing, condition data for a portion of the journey. In either case, the child devices 106 may transmit the condition data at any suitable frequency. These intervals can be regular or random, and in some embodiments, dependent upon the condition being monitored or events encountered. For example, temperature data may be transmitted every five minutes, whereas orientation data may only be transmitted every hour or when potential movement is detected (e.g., based on accelerometer data).

The child devices 106 transmit the condition data to parent devices 104. The parent devices 104 are located on the delivery vehicle 100 (e.g., in a cab of the delivery vehicle 100, in the cargo areas 112 of the delivery vehicle 100, on top of the delivery vehicle 100, etc.). Although the delivery vehicle depicted in FIG. 1 includes four parent devices 104 located about the periphery of the cargo area 112, such is not required. That is, the delivery vehicle 100 can include greater, or fewer, than four parent devices 104. For example, the delivery vehicle 100 may include only one parent device 104 (e.g., located centrally, near a door, etc.) or several parent devices 104 (e.g., located at predetermined distances and locations about the delivery vehicle 100).

Figure 2:
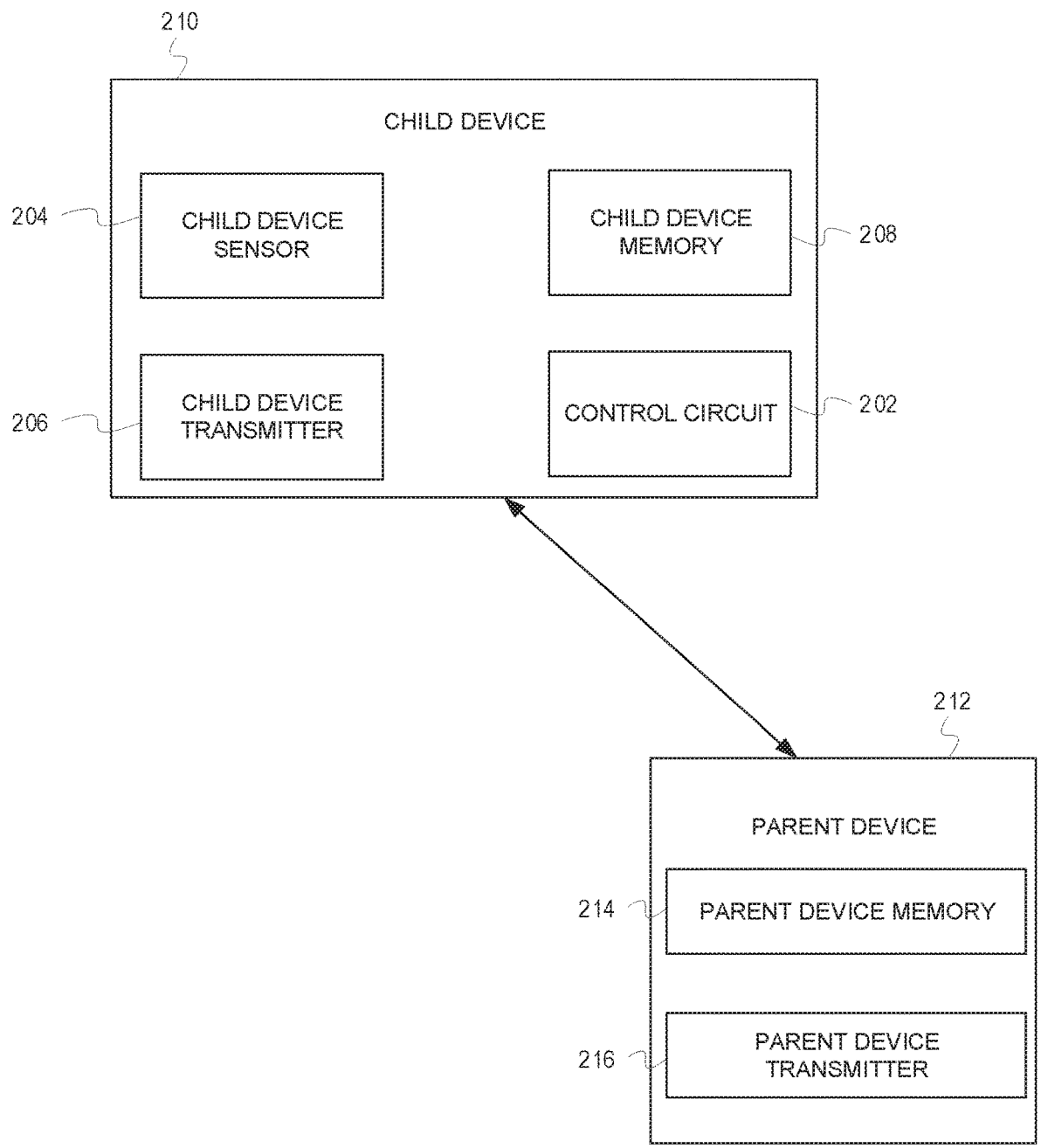
FIG. 2 depicts a system 200 for monitoring condition compliance, according to some embodiments.
Figure 3:
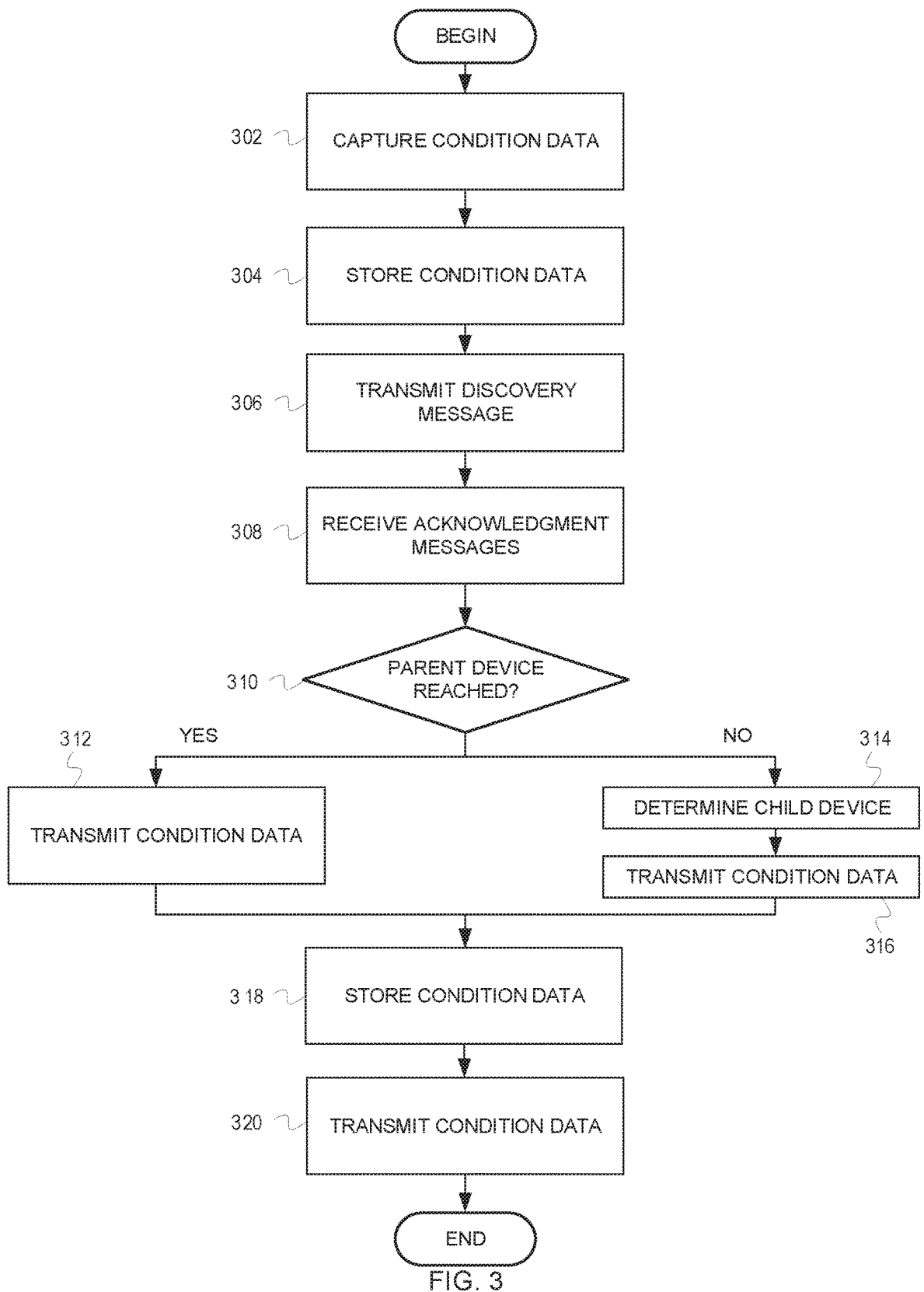
FIG. 3 is a flow chart depicting example operations for monitoring condition compliance, according to some embodiments.

In the case that one of the child devices 106 cannot transmit the condition data to one of the parent devices 104 (e.g., none of the parents devices 104 are within transmission range of the one of the child devices 106), the one of the child devices 106 can transmit its condition data to another one of the child devices 106, as discussed in more detail with respect to FIGS. 2 and 3. In such embodiments, other ones of the child devices 106 receiving the condition data from the one of the child devices 106 can relay the condition data to one of the parent devices 104, acting as a mesh network.

The parent devices 104 receive, and store, the condition data received from the child devices 106. When the delivery vehicle 100 arrives at a destination (e.g., a retail facility, a checkpoint, a distribution center 108, etc.), the parent devices 104 transmit the received condition data to master devices 110. The master devices 110 are located at the destination. In the example depicted in FIG. 1, the delivery vehicle 100 is arriving at a distribution center 108. The distribution center 108 includes at least one master device 110. The master devices 110 can be located about the distribution center 108, for example, near doors or docks of the distribution center 108.

While the discussion of FIG. 1 provides background regarding monitoring condition compliance, the discussion of FIG. 2 provides additional detail regarding a system for monitoring condition compliance.

FIG. 2 depicts a system 200 for monitoring condition compliance, according to some embodiments. The system includes a child device 210 and a parent device 212. The child device 210 includes a child device sensor 204, a child device transmitter 206, a child device memory 208, and a control circuit 202.

The child device 210 is configured to be incorporated with a container housing a product, or multiple products. For example, the child device 210 can be placed in the container, on the container, near the container, etc. The child device sensor 204 is configured to capture condition data associated with the product(s) (i.e., a product housed by the container). The condition monitored by the child device sensor 204 can be any suitable type of condition. For example, the child device sensor 204 can capture temperature data, humidity data, light exposure data, orientation data (e.g., orientation of the product and/or the container), moisture data, weight data, magnetic field data, electrical data, etc. Accordingly, the child device sensor 204 can be of any suitable type, including multiple sensors.

In embodiments in which the child device sensor 204 is, or includes, a weight sensor, the child device sensor 204 can be used to detect the presence of products in or on the container. In such embodiments, the child device sensor can be used to control a state of the child device 210 (e.g., a power state, a wake state, etc.). For example, the child device 210 may turn on when the weight sensor detects that a product is present in the container and turn off when the product is removed and/or no products are detecting in the container. Similarly, other types of sensors can be used to achieve this result (e.g., motion sensors, proximity sensors, light sensors, etc.). Regardless of the type of sensors used to control the state of the child device 210, battery life and/or operational life of the child device 210 may be increased. Such control may be important in embodiments in which the child device 210 includes a power supply such as a battery. Additionally, in embodiments in which the child device 210 is powered remotely (e.g., via inductive means), turning the child device 210 off when a product is not present may limit the transmission overhead and/or decrease the amount of data stored at the child device 210, other child devices, or the parent device 212.

The child device memory 208 stores the condition data captured by the child device sensor 204. The child device memory can be of any suitable type (e.g., flash memory, a hard disk, etc.). The child device memory 208 can be capable of storing a relatively limited amount of condition data (e.g., the amount of data captured over 10 minutes, 30 minutes, one hour, one day, etc.) or an unlimited amount of condition data, relative to the size and quantity of the condition data (e.g., all condition data captured during a journey). In some embodiments, the frequency with which the condition data is transmitted is dependent upon the storage capabilities of the child device memory 208. For example, the transmission frequency can be based on a time period in which the child device memory 208 should not have reached capacity, or can occur when the capacity of the child device memory 208 is reached. Additionally, in some embodiments, as described in more detail with respect to FIG. 3, the child device memory 208 can store condition data from other child devices.

The child device transmitter 206 is configured to transmit the condition data. In some embodiments, the child device transmitter 206 can receive data and/or messages from other devices, such as another child device, the parent device 212, a master device, a backend server, etc. In such embodiments, the child device transmitter 206 acts as a transceiver. Alternatively, the child device 210 can include distinct transmitters and receivers. In some embodiments, the child device transmitter 206 is configured to transmit via a different transmission medium than the parent device 212. For example, the child device transmitter 206 can transmit via a radio wave frequency (e.g., AM or FM bands) and the parent device 212 can transmit via the 802.11 standard and/or a radio wave frequency.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 is configured to cause transmission of the condition data and determine to which device to transmit the condition data. In some embodiments, while the child device 210 would prefer to transmit the condition data to the parent device 212, such transmission may not be possible. When transmitting the condition data, the control circuit 202 causes transmission of a discovery message. The discovery message is a one-to-many message seeking other devices to which the condition data can be transmitted.

The control circuit 202 receives acknowledgment messages from the other devices based on the discovery message. The acknowledgment messages include information about the sender of the acknowledgment message. For example, an acknowledgment message may contain an identifier of the device sending the message (e.g., a serial number or ID number), a location of the device sending the message, a type of the device sending the message (e.g. child device, parent device, master device, backend server, etc.), timestamp information, memory capacity information, etc. The control circuit 202 determines to which device to transmit the condition data based on the discovery messages. For example, the control circuit 202 may transmit the condition data to the parent device 212 if the control circuit 202 has received an acknowledgement message from the parent device 212 regardless of what other devices have responded. However, if multiple parent devices have responded to the control circuit's 202 discovery message, the control circuit 202 may choose from the responding parent devices based on capacity, location, etc.

If the parent device 212 (or any other parent device, if any) is not reached, the control circuit 202 determines from the other devices responding to the acknowledgment message to whom to transmit the condition data. This determination can be based on any suitable information, as discussed previously. As one example, if the acknowledgment message does not reach the parent device 212, the child device 210 can transmit the condition data to a child device having the greatest memory capacity or greatest available memory. As another example, the child device 210 can transmit the condition data to whichever non-parent device (e.g., another child device or an intermediate device) that is furthest from the child device 210. In such embodiments, the control circuit 202 can determine to which other device to transmit the condition data based on the Bellman-Ford algorithm. In any case, the ultimate goal is for the child device's 210 condition data to eventually reach the parent device 212 (or any other parent device). In this manner, the child device 210, as well as any other child devices and/or other devices can act as a mesh network.

The parent device 212 stores the condition data received from the child device 210 and/or any other devices. Accordingly, the parent device 212 can include a parent device memory 214. The parent device memory 214 can be of any suitable type. In some embodiments, the parent device memory 214 is larger than the child device memory 208 to accommodate storage of condition data from a number of child devices. The parent device 212 stores the condition data received from the child devices until the parent device 212 can transmit the condition data to a master device. Once the parent device reaches a master device, the parent device 212 transmit the condition data received from the child devices to the master device, via, for example, a parent device transmitter 216. In some embodiments, the parent device transmitter 216 acts as a transceiver, receiving condition data (and any other relevant messages and/or data) from child devices and transmitting condition data (and any other relevant messages and/or data) to master devices and/or child devices.

While the discussion of FIG. 2 provides detail regarding a system for monitoring condition compliance, the discussion of FIG. 3 describes example operations for monitoring condition compliance.

FIG. 3 is a flow chart depicting example operations for monitoring condition compliance, according to some embodiments. The flow begins at block 302.

At block 302, condition data is captured. For example, the condition data can be captured by one or more sensors associated with a child device (i.e., a child device sensor). The child device is configured to be incorporated with a container housing a product. For example, the child device can be placed in, attached, to, placed near, etc. the container. The child device sensor can capture any type of condition data desired. Accordingly, the child device sensor can be any suitable type of sensor. The flow continues at block 304.

At block 304, the condition data is stored. For example, the child device can store the condition data. The child device can store the condition data in a child device memory. The flow continues at block 306.

At block 306, a discovery message is transmitted. For example, the child device can transmit the discover message. The child device can transmit the discovery message via a transmitter (e.g., a child device transmitter). The discovery message is a one-to-many message seeking information from other devices. The discovery message can solicit information from the other devices and can include information about the child device (e.g., an identification, location, etc. of the child device). The flow continues at block 308.

At block 308, acknowledgment messages are received. For example, the child device can receive the acknowledgment messages. The child device can receive the acknowledgment messages via the child device transmitter, acting as a transceiver, or a child device receiver. The acknowledgment messages can include information about the device sending the acknowledgment messages (e.g., an identifier of the device sending the message (e.g., a serial number or ID number), a location of the device sending the message, a type of the device sending the message (e.g. child device, parent device, master device, backend server, etc.), timestamp information, memory capacity information, etc.). The flow continues at decision diamond 310.

At decision diamond 310, it is determined if a parent device was reached. For example, the child device can determine, based on the acknowledgment messages, if a parent device was reached. The child device can make this determination via a control circuit. In some embodiments, a parent device is reached if a parent device responds to the child devices discovery message and/or has capacity to accept additional condition data. If a parent device is reached, the flow continues at block 312. If a parent device is not reached, the flow continues at block 314.

At block 312, a parent device was reached and condition data is transmitted. For example, the child device can transmit the condition data to the parent device. The control circuit can cause transmission of the condition data. In some embodiments, the condition data includes additional information. For example, the condition data can include an identifier of the child device, a location of the child device, timestamp information, etc. After the child device has transmitted the condition data, the flow continues at block 318. However, as previously discussed, if a parent device was not reached, the flow continues from decision diamond 310 to block 314.

At block 314, a parent device was not reached and another child device is determined. For example, the child device, via the control circuit, can determine another child device to which to transmit the condition data. The control circuit determines the other child device from the devices that transmitted acknowledgment messages. In some embodiments, the goal is for the condition data to eventually reach a parent device. In such embodiments, the control circuit selects a child device from the child devices that responded to the discovery message based on this goal. In one embodiment, the control circuit selects the child device as the furthest device from the child device that responded to the discover message. The flow continues at block 316.

At block 316, the condition data is transmitted. For example, the child device can transmit the condition data. The control circuit can cause the transmission of the condition data. The condition data is transmitted to the determined child device. In some embodiments, the condition data includes additional information. For example, the condition data can include an identifier of the child device, a location of the child device, timestamp information, etc. In some embodiments, the determined child device attempts to transmit the received condition data to a subsequent child device and/or a parent device until the condition data is transmitted to a parent device. The flow continues at block 318.

At block 318, condition data is stored. For example, the parent device stores the condition data. The condition data is condition data received from a number of child devices. The parent device stores the condition data until it reaches a master device. The flow continues at block 320.

At block 320, condition data is transmitted. For example, the parent device can transmit the condition data to a master device. The condition data is condition data received from a number of child devices.

In some embodiments, a system for monitoring condition compliance comprises a child device, wherein the child device is configured to be incorporated with a container housing a product, the child device comprising a child device sensor, wherein the child device sensor is configured to capture condition data associated with the product, a child device memory, wherein the child device memory is configured to store the condition data associated with the product, a child device transmitter, wherein the child device transmitter is configured to transmit the condition data associated with the product, and a control circuit, wherein the control circuit is configured to cause transmission, via the child device transmitter, of a discovery message, receive, from other devices via the child device transmitter, acknowledgment messages, determine, based on the acknowledgment messages, if the discovery message reached a parent device, if the discovery message reached a parent device, cause transmission of the condition data associated with the product to the parent device, and if the discovery message did not reach a parent device, determine, from the other devices, one of the other devices that is furthest from the child device, and cause transmission of the condition data associated with the product to the one of the other devices furthest from the child device, and the parent device, the parent device configured to store condition data received from a plurality of child devices, and transmit, to a master device, the condition data received from the plurality of child devices.

In some embodiments, an apparatus and a corresponding method performed by the apparatus comprises capturing, by a child device sensor associated with a child device, condition data associated with a product, wherein the child device is incorporated with a container housing the product, storing, by a child device memory, the condition data associated with the product, transmitting, via a child device transmitter, the condition data associated with the product, receiving, via the child device transmitter from other devices, acknowledgment messages, determining, by a control circuit of the child device based on the acknowledgment messages, whether the discovery message reached a parent device, if the discovery message reached a parent device, transmitting, via the child device transmitter, the condition data associated with the product to the parent device, if the discovery message did not reach a parent device, determining, from the other devices, one of the other devices that is furthest from the child device, and transmitting, via the child device transmitter, the condition data associated with the product to the one of the other devices that is furthest from the child device, storing, by the parent device, condition data associated with a plurality of child devices, and transmitting, by the parent device to a master device, the condition data received from the plurality of child devices.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for monitoring condition compliance of products for retail sale in a delivery vehicle, the system comprising:
    a child device, wherein the child device is configured to be incorporated with a container housing a product, wherein the container is located in the delivery vehicle, the child device comprising:
    a child device sensor, wherein the child device sensor is configured to capture condition data associated with the product;
    a child device memory, wherein the child device memory is configured to store the condition data associated with the product;
    a child device transmitter, wherein the child device transmitter is configured to transmit the condition data associated with the product; and
    a control circuit, wherein the control circuit is configured to:
        cause transmission, via the child device transmitter, of a discovery message;
        receive, from other devices via the child device transmitter, acknowledgment messages, wherein the other devices comprise other child devices and a parent device;
        determine, based on the acknowledgment messages, if the discovery message reached the parent device;
        if the discovery message reached the parent device, cause transmission of the condition data associated with the product to the parent device; and
        if the discovery message did not reach the parent device,
            determine, from the other child devices, one of the other child devices that is furthest from the child device; and
            cause transmission of the condition data associated with the product to the one of the other child devices furthest from the child device; and
    the parent device, wherein the parent device is located in the delivery vehicle, the parent device configured to:
    store condition data received from a plurality of child devices; and
    transmit, to a master device, the condition data received from the plurality of child devices.

2. The system of claim 1, wherein the parent device comprises:
    a parent device memory, wherein the parent device memory is configured to store the condition data received from a plurality of child devices; and
    a parent device transmitter, wherein the parent device transmitter is configured to transmit the condition data received from a plurality of child devices.

3. The system of claim 2, wherein the child device transmitter is configured to transmit via a first transmission medium and the parent device transmitter is configured to transmit via a second transmission medium.

4. The system of claim 3, wherein the first transmission medium is radio wave and the second transmission medium is based on an 802.11 standard.

5. The system of claim 1, wherein the child device further comprises:
    a weight sensor, wherein the weight sensor is configured to detect the product in the container.

6. The system of claim 5, wherein the control circuit is further configured to:
    receive, from the weight sensor, an indication that the product is in the container; and
    cause, based on the indication that the product is in the container, the child device to turn on.

7. The system of claim 1, wherein the condition data associated with the product is one or more of a temperature, a humidity, light exposure, orientation, and a presence of moisture.

8. The system of claim 1, wherein the container and the parent device are located in a cargo area, and wherein the child device sensor captures the data associated with the product during transport.

9. The system of claim 1, wherein the control circuit determines the one of the other devices that is furthest from the child device based on a Bellman-Ford algorithm.

10. A method for monitoring condition compliance of products for retail sale in a delivery vehicle, the method comprising:
    capturing, by a child device sensor associated with a child device, condition data associated with a product, wherein the child device is incorporated with a container housing the product, and wherein the container is located in the delivery vehicle;
    storing, by child device memory, the condition data associated with the product;
    transmitting, via a child device transmitter, a discovery message;
    receiving, via the child device transmitter from other devices, acknowledgment messages wherein the other devices comprise other child devices and a parent device;

determining, by a control circuit of the child device based on the acknowledgment messages, whether the discovery message reached the parent device;

if the discovery message reached the parent device, transmitting, via the child transmitter, the condition data associated with the product to the parent device;

if the discovery message did not reach the parent device, determining, from the other child devices, one of the other child devices that is furthest from the child device; and transmitting, via the child device transmitter, the condition data associated with the product to the one of the other child devices that is furthest from the child device;

storing, by the parent device, condition data received from a plurality of child devices, wherein the parent device is located in the delivery vehicle; and transmitting, by the parent device to a master device, the condition data received from the plurality of child devices.

11. The method of claim 10, wherein the parent device includes a parent device memory configured to store the condition data associated with a plurality of child devices and a parent device transmitter configured to transmit the condition data received from the plurality of child devices.

12. The method of claim 11, wherein the child device transmitter is configured to transmit via a first transmission medium and the parent device transmitter is configured to transmit via a second transmission medium.

13. The method of claim 12, wherein the first transmission medium is radio wave and the second transmission medium is based on an 802.11 standard.

14. The method of claim 10, wherein the child device includes a weight sensor configured to detect the product in the container.

15. The method of claim 14, further comprising:
receiving, from the weight sensor, an indication that the product is in the container; and
causing, based on the indication that the product is in the container, the child device to turn on.

16. The method of claim 10, wherein the condition data associated with the product is one or more of a temperature, a humidity, light exposure, orientation, and a presence of moisture.

17. The method of claim 10, wherein the container and the parent device are located in a cargo area, and wherein the child device sensor captures the data associated with the product during transport.

18. The method of claim 10, wherein the determining the one of the other devices that is furthest from the child device is based on a Bellman-Ford algorithm.

* * * * *